US012066767B2

(12) United States Patent
Kohno et al.

(10) Patent No.: US 12,066,767 B2
(45) Date of Patent: Aug. 20, 2024

(54) IMAGE FORMING APPARATUS

(71) Applicant: CANON KABUSHIKI KAISHA, Tokyo (JP)

(72) Inventors: Tatsuya Kohno, Chiba (JP); Takahito Fuse, Chiba (JP); Atsushi Matsumoto, Ibaraki (JP); Hiroaki Ishida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/182,882

(22) Filed: Mar. 13, 2023

(65) Prior Publication Data

US 2023/0305428 A1 Sep. 28, 2023

(30) Foreign Application Priority Data

Mar. 23, 2022 (JP) ................................ 2022-046196
Mar. 23, 2022 (JP) ................................ 2022-046197

(51) Int. Cl.
*G03G 15/06* (2006.01)
*G03G 15/02* (2006.01)

(52) U.S. Cl.
CPC ....... *G03G 15/065* (2013.01); *G03G 15/0266* (2013.01)

(58) Field of Classification Search
CPC ......................... G03G 15/065; G03G 15/0266
See application file for complete search history.

(56) References Cited

U.S. PATENT DOCUMENTS

2018/0239287 A1* 8/2018 Iwayama ............. G03G 15/065

FOREIGN PATENT DOCUMENTS

| | | |
|---|---|---|
| JP | H07134462 A | 5/1995 |
| JP | 2006047885 A | 2/2006 |
| JP | 2012128320 A | 7/2012 |
| JP | 2017107075 A | 6/2017 |

* cited by examiner

*Primary Examiner* — Sandra Brase
(74) *Attorney, Agent, or Firm* — Canon U.S.A., Inc. IP Division

(57) ABSTRACT

An image forming apparatus includes an image bearing member and a developer bearing member. A first period is from when rotational drive of the developer bearing member is started until increased to a speed at which the image forming apparatus performs image forming. A first absolute value of a difference between a developer bearing member surface potential Vdc and an image bearing member surface potential Vd, as determined when the image bearing member is facing the developer bearing member, is obtained during the first period. The value |Vdc−Vd| obtained during the first period is smaller than the value |Vdc−Vd| obtained after the first period. During the first period, the image bearing member surface potential Vd at the facing position is a first potential and, after the first period, the image bearing member surface potential Vd at the facing position becomes a second potential different from the first potential.

13 Claims, 13 Drawing Sheets

IMAGE FORMING APPARATUS

BACKGROUND

Field

The present disclosure relates to an image forming apparatus including a developing device that develops an electrostatic latent image formed on an image bearing member.

Description of the Related Art

An image forming apparatus includes a photosensitive drum (image bearing member), a charging device that changes the image bearing member, and a developing device including a development roller (developer bearing member) that bears developer containing nonmagnetic toner and a magnetic carrier, to develop an electrostatic latent image formed on the image bearing member. As part of forming a toner image on a sheet, developer is transferred from the development roller to the photosensitive drum and, thereafter, developer in a non-image portion of the photosensitive drum may be drawn from the photosensitive drum back to the development roller.

A potential difference Vback refers to a potential difference between a surface potential (non-image portion potential) Vd of a charging bias charged to the photosensitive drum by a charging device, and a direct-current component Vdc of a development bias applied to the development roller. The potential difference Vback generates an electric field for drawing toner back from the photosensitive drum in a direction toward the development roller. Japanese Patent Application Laid-Open No. 2012-128320 discusses an image forming apparatus that changes a potential difference Vback between sheets in continuous image forming jobs, in accordance with the number of sheets on which images have been formed.

SUMMARY

According to the consideration of inventors, it has been revealed that, during a non-image forming period (a first period) immediately after the rotational drive of the development roller has been started in accordance with the start of a pre-rotation operation, a phenomenon (carrier adhesion) in which a carrier in the developer adheres to a non-image portion of the photosensitive drum occurs more easily as compared with an image forming timing. This is attributed to the fact that, while the rotational speed of the development roller is stable during a second period at the image forming timing because the first period of the start-up of the rotational drive of the development roller has been completed, the rotational speed of the development roller is not stabilized during the non-image forming period (the first period) in the pre-rotation operation for the start-up of the rotational drive of the development roller.

In addition, according to the consideration of inventors, it has been revealed that, immediately after the second period and during a third period in which the rotational speed of the development roller has started to decelerate from a stable speed at the image forming timing after an image forming end, the phenomenon (carrier adhesion) in which a carrier in the developer adheres to the non-image portion of the photosensitive drum also occurs more easily as compared with the second period consisting of the image forming timing. This is attributed to the fact that, while the rotational speed of the development roller is stable during the second period at the image forming timing, immediately after the rotational speed of the development roller has started to decelerate in the third period from the speed in the second period at the image forming timing after an image forming end, the rotational speed of the development roller is not stabilized for the falling of the rotational drive of the development roller.

Generally, in a case where an absolute value of the potential difference Vback is decreased, carrier adhesion tends to be suppressed as compared with a case where an absolute value of the potential difference Vback is increased.

To suppress carrier adhesion during a non-image forming period in the first period of a pre-rotation operation, it is considered to uniformly decrease an absolute value of the potential difference Vback after the start of the pre-rotation operation.

To suppress carrier adhesion during a period from when the rotational speed of the development roller has started to decelerate from the speed of the development roller during the second period at the image forming timing, until the rotational speed of the development roller becomes zero (e.g., during the third period), it is considered to uniformly decrease an absolute value of the potential difference Vback after the start of image forming. However, in a case where an absolute value of the potential difference Vback is decreased, force for attracting toner from the photosensitive drum toward the development roller becomes weaker as compared with a case where an absolute value of the potential difference Vback is increased. As a result, toner (fogging toner) becomes more likely to remain adhered to the non-image portion of the photosensitive drum than to be drawn to the development roller.

The disclosed image forming apparatus works towards suppressing fogging toner during a second period at an image forming timing while suppressing carrier adhesion during a first period from when the rotational drive of a developer bearing member has been started, until the rotational speed of the developer bearing member reaches a speed at the image forming timing, and works towards suppressing fogging toner during the second period at an image forming timing while suppressing carrier adhesion during a third period from when the rotational speed of the developer bearing member at the image forming timing has started to decelerate until the rotational speed of the developer bearing member becomes zero.

According to an aspect of the present disclosure, an image forming apparatus includes an image bearing member, a developing device including a development container configured to contain developer having toner and a carrier, and including a developer bearing member that is rotatable and configured to bear the developer to develop an electrostatic latent image formed on the image bearing member, a drive unit configured to rotationally drive the developer bearing member, a development bias application unit configured to apply a development bias to the developer bearing member, and a charging bias application unit configured to apply a charging bias to the image bearing member, wherein (i) a first absolute value of a difference between a surface potential of the developer bearing member to which the development bias has been applied by the development bias application unit and a surface potential of the image bearing member to which the charging bias has been applied by the charging bias application unit, where the surface potential of the image bearing member is at a facing position at which the image bearing member faces the developer bearing member and the first absolute value is obtained during a period from when rotational drive of the developer bearing member has been started by the drive unit until a rotational speed of the developer bearing member rotationally driven by the drive unit has reached a rotational speed of the developer bearing member at an image forming timing is smaller than (ii) a second absolute value of the difference between the surface potential of the developer bearing member to which the development bias has been applied by the development bias application unit and the surface potential of the image bearing member to which the charging bias has been applied by the charging bias application unit, where the surface potential of the image bearing member is at the facing position and the second absolute value is obtained after the rotational speed of the developer bearing member has reached the rotational speed of the developer bearing member at the image forming timing, wherein the charging bias application unit applies the charging bias to the image bearing member so that a surface potential of the image bearing member at the facing position becomes a first potential during the period from when rotational drive of the developer bearing member has been started by the drive unit, until the rotational speed of the developer bearing member rotationally driven by the drive unit has reached the rotational speed of the developer bearing member at the image forming timing, and wherein the charging bias application unit applies the charging bias to the image bearing member so that the surface potential of the image bearing member at the facing position becomes a second potential different from the first potential, after the rotational speed of the developer bearing member rotationally driven by the drive unit has reached the rotational speed of the developer bearing member at the image forming timing.

Further features of the present disclosure will become apparent from the following description of exemplary embodiments with reference to the attached drawings.

DESCRIPTION OF THE EMBODIMENTS

Hereinafter, exemplary embodiments of the present disclosure will be described in detail with reference to the attached drawings. The following exemplary embodiments are not intended to limit the present disclosure set forth in the appended claims. In addition, not all the combinations of features described in the present exemplary embodiment are always essential. The present disclosure can be executed in various use applications such as printers, various printing machines, copiers, facsimiles, and multifunction peripherals.

Configuration of Image Forming Apparatus

Figure 1:
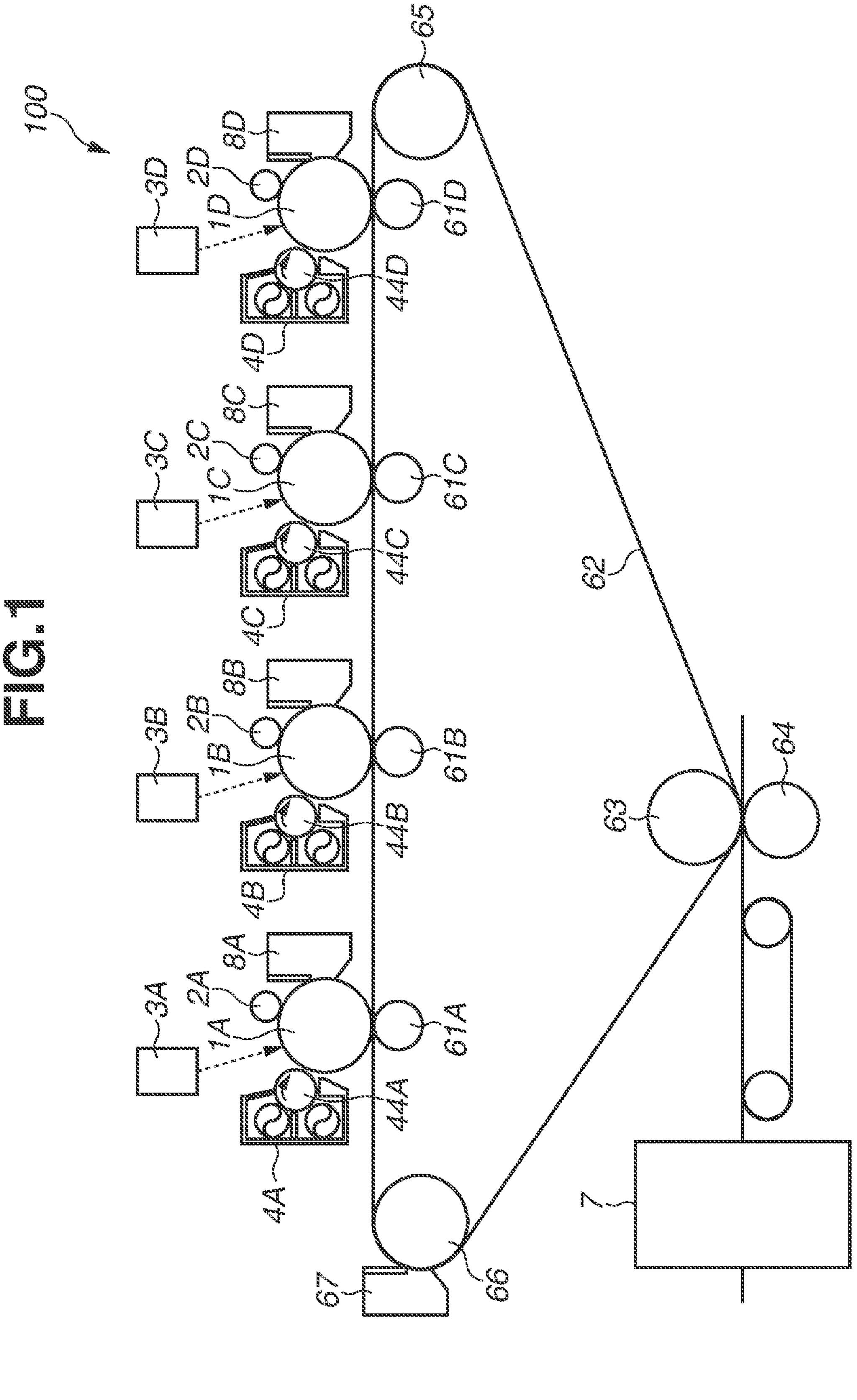
FIG. 1 is a diagram illustrating a configuration of an image forming apparatus according to a first exemplary embodiment.

FIG. 1 is a configuration diagram of an in-line system (four-drum system) color image forming apparatus 100.

The image forming apparatus 100 includes four image forming units including an image forming unit that forms a yellow image, an image forming unit that forms a magenta image, an image forming unit that forms a cyan image, and an image forming unit that forms a black image. These four image forming units are arranged in a line at certain intervals. Hereinafter, in a case where alphabetical letters A, B, C, and D are added to reference numerals, the reference numerals indicate members (or devices) of yellow, magenta, cyan, and black colors, and in a case where only a reference numeral is described without any alphabetical letter, the reference numeral indicates a member (or device) irrespective of color.

In the image forming units, photosensitive drums 1A, 1B, 1C, and 1D each serving as an image bearing member are arranged. Each of the photosensitive drums 1A, 1B, 1C, and 1D is a negatively-charged organic photosensitive member, includes a photosensitive layer on a drum base member such as aluminum, and is rotationally driven by a drive device at a predetermined process speed.

Charging rollers 2A, 2B, 2C, and 2D, developing devices 4A, 4B, 4C, and 4D, and primary transfer rollers 61A, 61B, 61C, and 61D are respectively arranged around the photosensitive drums 1A, 1B, 1C, and 1D.

An image forming unit that uses the charging roller 2A formed of conductive rubber, as a charging device will now be described in detail. The charging roller 2A is rotatably held by a bearing member at both end portions of a core metal with a fixed axis distance being maintained. The charging roller 2A is brought into pressure contact with the surface of the photosensitive drum 1 by predetermined pressing force being applied by a pressing spring toward the photosensitive drum 1. The charging roller 2A rotates in accordance with the rotation of the photosensitive drum 1, and a charging bias with a predetermined condition is applied to the core metal of the charging roller 2A. The surface of the photosensitive drum 1 rotating in contact with the charging roller 2A is thereby contact-charged to predetermined polarity and potential.

Furthermore, exposure units (exposure devices) 3A, 3B, 3C, and 3D for forming electrostatic latent images on the charged surfaces of the photosensitive drums 1 are arranged above the photosensitive drums 1A, 1B, 1C, and 1D. The exposure device 3A is electrically connected with an image processing unit (not illustrated), and forms an electrostatic latent image in accordance with an output image signal transmitted from the image processing unit.

The development units (developing devices) 4A, 4B, 4C, and 4D respectively contain yellow toner, cyan toner, magenta toner, and black toner. Development rollers 44A, 44B, 44C, and 44D are rotationally driven by the respective drive units (development motors) to develop electrostatic latent images formed on the surfaces of the photosensitive drums 1A, 1B, 1C, and 1D, and form toner images.

A rotatable endless intermediate transfer belt 62 being an intermediate transfer member is arranged at a position that each image forming unit faces. The intermediate transfer belt 62 is stretched around a drive roller 65, a secondary transfer counter roller 63, and a tension roller 66. By the driving of the drive roller 65 to which a motor is connected, the intermediate transfer belt 62 is rotated (moved) in an arrow direction (counterclockwise rotation direction). Toner images that have reached positions of the intermediate transfer belt 62 that face primary transfer rollers 61A, 61B, 61C, and 61D are transferred from the photosensitive drums 1 onto the intermediate transfer belt 62 by a primary transfer voltage.

The secondary transfer counter roller 63 forms a secondary transfer portion by getting into contact with a secondary transfer roller 64 via the intermediate transfer belt 62. A belt cleaning device 67 that removes and collects transfer residual toner remaining on the surface of the intermediate transfer belt 62 is arranged on the outside of the intermediate transfer belt 62.

To perform heat press processing for fixing toner onto a transfer material, a fixing device 7 is installed on a downstream side of the secondary transfer portion at which the secondary transfer counter roller 63 and the secondary transfer roller 64 get into contact with each other, in a rotational direction of the intermediate transfer belt 62.

Cleaning members (drum cleaning devices) 8A, 8B, 8C, and 8D for cleaning off toner remaining on the surfaces of the photosensitive drums 1A, 1B, 1C, and 1D are respectively arranged around the photosensitive drums 1A, 1B, 1C, and 1D.

Figure 2:
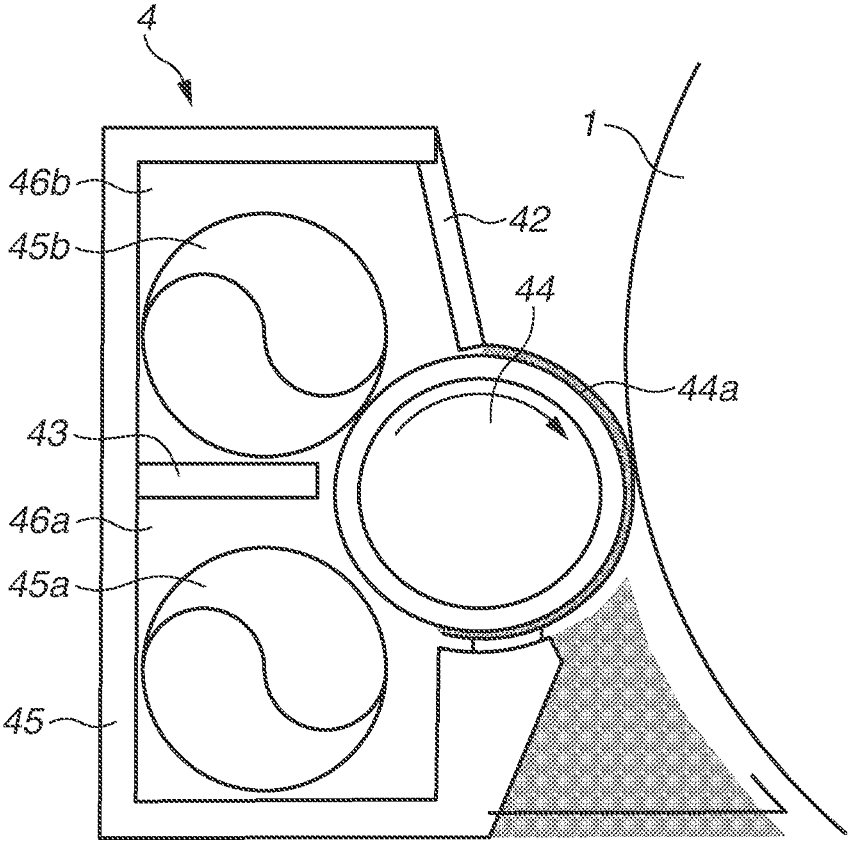
FIG. 2 is a cross-sectional view illustrating a configuration of a developing device according to the first exemplary embodiment.

FIG. 2 illustrates a cross-sectional view of a configuration of the developing device 4.

The developing device 4 includes a development container 45 containing developer having toner and a carrier. The development container 45 is partitioned by a partition wall 43 into a stirring chamber 46*a* and a developing chamber 46*b*, and developer is circulated between the stirring chamber 46*a* and the developing chamber 46*b*. A screw 45*a* for stirring and conveying developer in the stirring chamber 46*a* is arranged in the stirring chamber 46*a*. A screw 45*b* for stirring and conveying developer in the developing chamber 46*b* is arranged in the developing chamber 46*b*.

The developing device 4 also includes a developer regulation member 42. The developer regulation member 42 regulates an amount of developer borne on a surface 44*a* of the development roller 44.

Developer contained in the developing device 4 (development container) is two-component developer in which negatively-charged nonmagnetic toner and a magnetic carrier are mixed. The nonmagnetic toner is formed by including a coloring agent or wax components into resin such as polyester or styrene, and making the resultant resin into powder by smash or polymerization. The magnetic carrier is formed by applying resin coating to a surface layer of a core containing resin particles blended with ferrite particles or magnetic powder.

A process of developing toner onto a development region of the photosensitive drum 1 will be described. After the photosensitive drum 1 is uniformly charged by the charging roller 2A (FIG. 1) to a charging potential Vd [V], an image portion of the photosensitive drum 1 is exposed by the exposure device 3A, and a potential of the image portion of the photosensitive drum 1 becomes an exposure potential V1 [V].

A direct-current (DC) voltage (charging DC bias) or a voltage (charging DC+AC bias) obtained by superimposing an alternating-current (AC) voltage onto a direct-current voltage is applied to the charging roller 2A by a high voltage power source (charging bias application unit). Then, the charging DC bias or the charging DC+AC bias is applied to the photosensitive drum 1 via the charging roller 2A being in contact with the photosensitive drum 1.

A direct-current voltage (development DC bias) or a voltage (development DC+AC bias) obtained by superimposing an alternating-current voltage onto a direct-current voltage is applied to the development roller 44 by a high voltage power source (development bias application unit).

When a voltage of a direct-current component of the development roller 44 is denoted by Vdc [V], an absolute value |Vdc−V1| of a difference from an exposure potential V1 is denoted by Vcont, and the difference generates an electric field for carrying toner from the surface 44*a* of the development roller 44 to an image portion of the photosensitive drum 1.

An absolute value |Vdc−Vd| of a difference between the direct-current voltage Vdc and the charging potential Vd is called a potential difference Vback, and the potential difference Vback generates an electric field for drawing toner back in a direction toward the development roller 44 from the photosensitive drum 1. This is provided to suppress a phenomenon (so-called fogging phenomenon) in which toner (fogging toner) adheres to a non-image portion on the photosensitive drum 1.

In a case where an absolute value of the potential difference Vback is increased, because force for attracting toner to the development roller 44 becomes stronger as compared with a case where an absolute value of the potential difference Vback is decreased, toner (fogging toner) tends to become less likely to adhere to a non-image portion on the photosensitive drum 1. On the other hand, in a case where an absolute value of the potential difference Vback is decreased, as compared with a case where an absolute value of the potential difference Vback is increased, a phenomenon (carrier adhesion) in which a carrier adheres to a non-image portion on the photosensitive drum 1 tends to be suppressed.

Dark decaying is a situation where a potential of a surface of a photosensitive drum decreases with elapsed time after the photosensitive drum is charged by a charging roller. The charging potential Vd of the photosensitive drum 1 includes dark decaying. Thus, a charging potential Vd obtained immediately after a charging bias is applied to the photosensitive drum 1 by the charging roller 2A, and a charging potential Vd obtained at a time point thereafter at which a charged position of the photosensitive drum 1 reaches a facing position facing the development roller 44, by the rotation of the photosensitive drum 1 become different values.

In the first exemplary embodiment, a phenomenon (fogging phenomenon) at a facing position at which the photosensitive drum 1 faces the development roller 44 is targeted. Thus, the charging potential Vd is assumed to refer not to the value of the charging potential Vd obtained immediately after a charging bias is applied to the photosensitive drum 1, but to the value of the charging potential Vd obtained at the time point at which a charged position of the photosensitive drum 1 reaches the facing position facing the development roller 44, by the rotation of the photosensitive drum 1. The same applies to another potential such as a latent image potential V1 of the photosensitive drum 1.

Conventional Example

Figure 7:
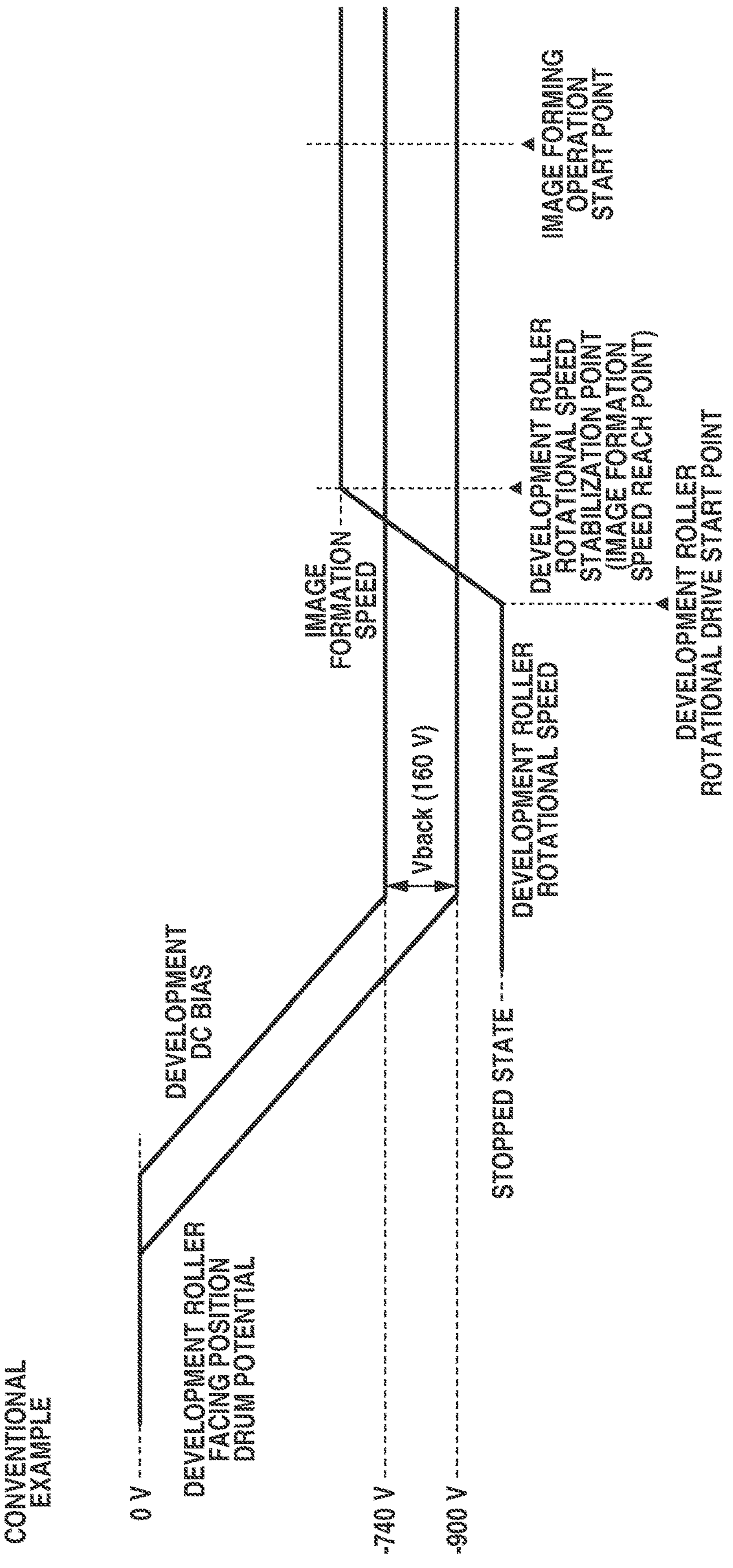
FIG. 7 is a diagram illustrating a sequence of an image forming operation (image formation operation) according to a conventional example.

Precedential to the description of a sequence of an image forming operation (image formation operation) according to the first exemplary embodiment, a sequence of an image formation operation according to a conventional example will be described with reference to FIG. 7. FIG. 7 illustrates the rotational drive of the development roller 44 at a start timing of an image formation operation, a development DC bias applied to the development roller 44, a value of the charging potential Vd at a facing position at which the photosensitive drum 1 faces the development roller 44, and a timing chart according to the conventional example.

In the operation according to the conventional example that is illustrated in FIG. 7, simultaneously with the start of a pre-rotation operation and the start of rotational drive of the photosensitive drum 1, the application of a charging bias to the charging roller 2A is started, and the photosensitive drum 1 is uniformly charged (Vd=−900 V) at the facing position facing the development roller 44.

If a charged position of the photosensitive drum 1 reaches the facing position facing the development roller 44, by the rotation of the photosensitive drum 1, the application of a development DC bias (Vdc=−740 V) to the development roller 44 is started. Then, after the charging potential Vd of the photosensitive drum 1 and the development DC bias Vdc become stable, the rotational drive of the development roller 44 is started. In the operation according to the conventional example, a potential difference Vback (=160 V) being a fogging-removing potential difference at the time is controlled to become the same value as the value of the potential difference Vback at an image forming timing.

Carrier adhesion amounts and fogging toner amounts obtained when an absolute value of the potential difference Vback was changed to 60 V, 110 V, 160 V, and 210 V in the operation according to the conventional example were measured. Table 1 indicates measurement results of carrier adhesion amounts and fogging toner amounts obtained when an absolute value of the potential difference Vback during a period from when the rotational drive of the development roller 44 has been started, until the rotational speed of the development roller 44 reaches the same speed as the speed at an image forming timing was changed. In addition, Table 2 indicates measurement results of carrier adhesion amounts and fogging toner amounts obtained when an absolute value of the potential difference Vback at the image forming timing was changed in the operation according to the conventional example.

As for items of carrier adhesion in Tables 1 and 2, "acceptable" indicates that the degree of carrier adhesion is at a level allowable as image quality, and "unacceptable" indicates that the degree of carrier adhesion is at a level unallowable as image quality. As for items of fogging toner in Tables 1 and 2, "acceptable" indicates that the degree of fogging toner is at a level allowable as image quality, and "unacceptable" indicates that the degree of fogging toner is at a level unallowable as image quality. The level unallowable as image quality means that an image defect occurs.

TABLE 1

| | Vback after drive start of development roller | | | |
|---|---|---|---|---|
| | 60 V | 110 V | 160 V | 210 V |
| Carrier adhesion | Acceptable | Acceptable | Unacceptable | Unacceptable |
| Fogging toner | Unacceptable | Acceptable | Acceptable | Acceptable |

TABLE 2

| | Vback at image forming | | | |
|---|---|---|---|---|
| | 60 V | 110 V | 160 V | 210 V |
| Carrier adhesion | Acceptable | Acceptable | Acceptable | Unacceptable |
| Fogging toner | Unacceptable | Unacceptable | Acceptable | Acceptable |

In this experiment, during the formation of a blank image (i.e., image with an image ratio of 0%) using the image forming apparatus 100, an operation is suspended, and a carrier and fogging toner that adhere onto the photosensitive drum 1 were collected using a tape. The carrier adhesion amount was obtained by counting the number of carrier particles in a region of 3 cm×3 cm, and calculating the number of adhering carrier particles per square centimeter. As the fogging toner amount, a density was measured using the X-Rite 500 series color reflection densitometer manufactured by the X-Rite, Inc.

During a period from when the rotational drive of the development roller 44 has been started, until the rotational speed of the development roller 44 reaches the same speed as the speed at an image forming timing, in a case where the potential difference Vback is 160 V or more, the degree of carrier adhesion becomes a level unallowable as image quality. In contrast to this, at the image forming timing, in a case where the potential difference Vback is 210 V or more, the degree of carrier adhesion becomes a level unallowable as image quality.

On the other hand, as for fogging toner, during the period from when the rotational drive of the development roller 44 has been started, until the rotational speed of the development roller 44 reaches the same speed as the speed at an image forming timing, in a case where the potential difference Vback is 60 V or less, the degree of fogging toner becomes a level unallowable as image quality. In contrast to this, at the image forming timing, in a case where the potential difference Vback is 110 V or less, the degree of fogging toner becomes a level unallowable as image quality.

From the above-described results, it can be seen that an optimum potential difference Vback by which image defects attributed to carrier adhesion and fogging toner do not occur varies between the period from when the rotational drive of the development roller 44 has been started, until the rotational speed of the development roller 44 reaches the same speed as the speed at an image forming timing, and the image forming timing.

Subsequently, a sequence of an image forming operation (image formation operation) according to the first exemplary embodiment will be described with reference to FIG. 3. FIG.

3 illustrates the rotational drive of the development roller 44 at a start timing of an image formation operation, a development DC bias applied to the development roller 44, a value of the charging potential Vd at a facing position at which the photosensitive drum 1 faces the development roller 44, and a timing chart according to the first exemplary embodiment.

Simultaneously with the start of a pre-rotation operation and the start of rotational drive of the photosensitive drum 1, the application of a charging bias to the photosensitive drum 1 is started, and the photosensitive drum 1 is uniformly charged to a first charging potential (Vd1=−850 V). Then, if a charged position of the photosensitive drum 1 reaches a facing position facing the development roller 44, by the rotation of the photosensitive drum 1, the application of a development DC bias (Vdc=−740 V) to the development roller 44 is started. After a certain period of time elapses since the application of the development DC bias, the charging potential Vd of the photosensitive drum 1 and the development DC bias enter a stable state, and the rotational drive of the development roller 44 is started. A potential difference Vback (start-up Vback) at the time is 110 V.

Next, a charging DC bias is changed after the rotational speed of the development roller 44 has reached the same speed as the speed at the image forming timing, and before a start point of an image forming operation, and the photosensitive drum 1 is uniformly charged so that the charging potential Vd of the photosensitive drum 1 becomes a second charging potential (Vd2=−900 V) being the same value as that at the image forming timing. A potential difference Vback at the time becomes 160 V.

Figure 3:
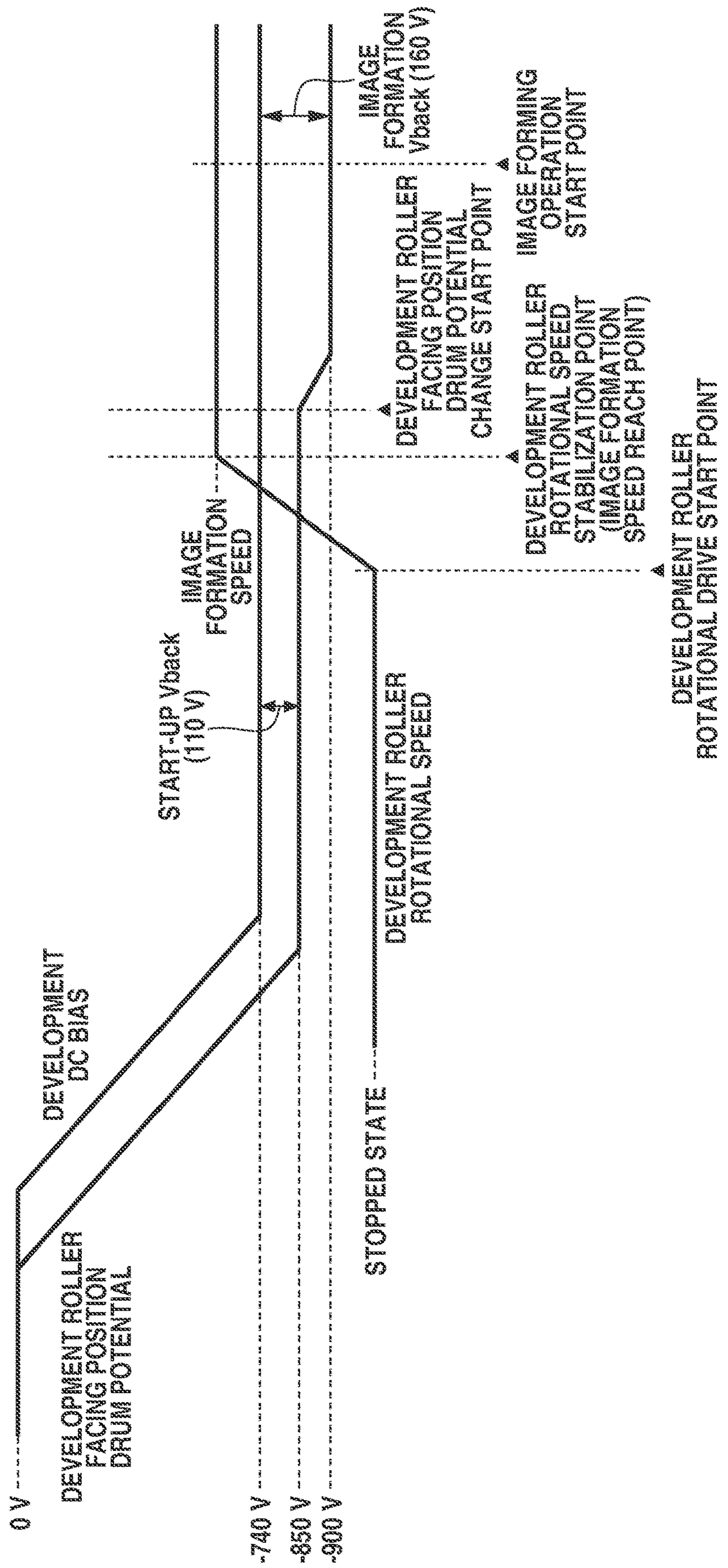
FIG. 3 is a diagram illustrating a sequence of an image forming operation (image formation operation) according to the first exemplary embodiment.

By executing the control illustrated in FIG. 3, carrier adhesion can be suppressed by setting a potential difference Vback (start-up Vback) to 110 V during the period from when the rotational drive of the development roller 44 has been started, until the rotational speed of the development roller 44 reaches the speed at an image forming timing. In addition, fogging toner and carrier adhesion at the image forming timing can be suppressed by setting a potential difference Vback (image formation Vback) to 160 V at the image forming timing.

In the first exemplary embodiment described above, the start-up Vback is made smaller than the image formation Vback. According to the first exemplary embodiment as described above, it is possible to suppress fogging toner at an image forming timing while suppressing carrier adhesion during a period from when the rotational drive of the development roller 44 has been started, until the rotational speed of the development roller 44 reaches a speed at the image forming timing.

Referring to FIG. 3, the description has been given of an example of control in which a charging DC bias is changed with a development DC bias (Vdc=−740 V) to the development roller 44 being kept constant, when a potential difference Vback is changed from the start-up Vback to the image formation Vback, but the control is not limited to this. As long as the start-up Vback is smaller than the image formation Vback, a modified example of also changing a development DC bias in addition to changing a charging DC bias may be applied.

Subsequently, a second exemplary embodiment will be described. A basic configuration of the second exemplary embodiment is the same as that of the first exemplary embodiment. Thus, the component having a function and a configuration that are substantially the same as or equivalent to those in the first exemplary embodiment is assigned the same reference numeral, and the detailed description thereof will be omitted, and only a component unique to the second exemplary embodiment will be described in detail.

Figure 4:
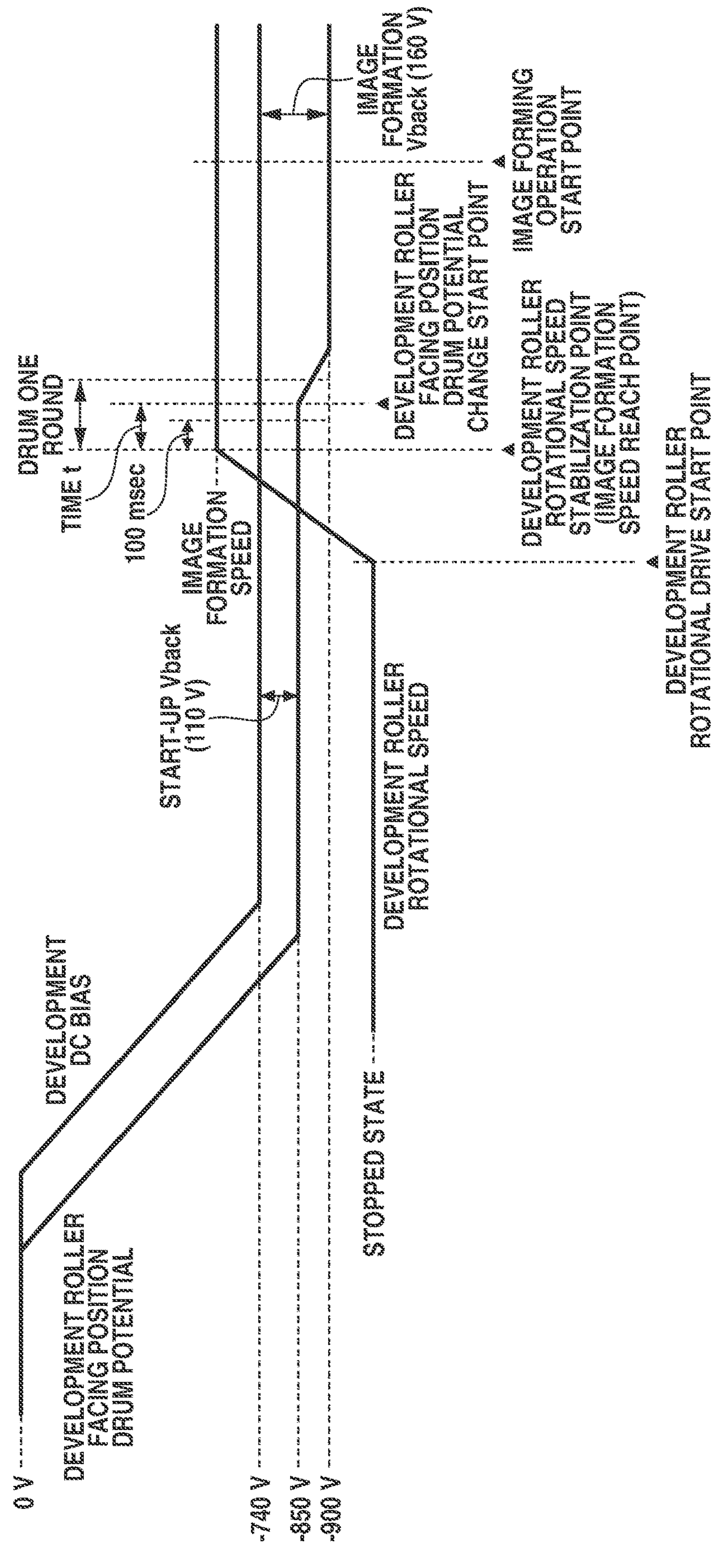
FIG. 4 is a diagram illustrating a sequence of an image forming operation (image formation operation) according to a second exemplary embodiment.

A sequence of an image forming operation (image formation operation) according to the second exemplary embodiment will be described with reference to FIG. 4. FIG. 4 illustrates the rotational drive of the development roller 44 at a start timing of an image formation operation, a development DC bias applied to the development roller 44, a value of the charging potential Vd at a facing position at which the photosensitive drum 1 faces the development roller 44, and a timing chart according to the second exemplary embodiment.

In the first exemplary embodiment described above, the charging potential Vd of the photosensitive drum 1 is changed after the rotational speed of the development roller 44 has reached the same speed as the speed at the image forming timing, and before an image forming operation start point. Nevertheless, in a case where the charging potential Vd of the photosensitive drum 1 is changed immediately after the rotational drive of the development roller 44 has reached the same speed as the speed at the image forming timing, the charging potential Vd of the photosensitive drum 1 might be changed in a state in which the rotational speed of the development roller 44 is not stabilized sufficiently. In such a state, because the potential difference Vback is not controlled to become the optimum Vback in the suppression of carrier adhesion and fogging toner with respect to the rotational speed of the development roller 44, carrier adhesion or fogging toner might occur.

On the other hand, after the development roller 44 rotates once (about 100 msec in the second exemplary embodiment), the rotational speed of the development roller 44 is sufficiently stabilized. Thus, the charging potential Vd of the photosensitive drum 1 is desirably changed after the lapse of 100 msec since the rotational speed of the development roller 44 has reached the same speed as the speed at the image forming timing, and before an image forming operation start point.

On the other hand, from the viewpoint of productivity, it is desirable to execute prior control before the start of an image forming operation in a short time. Thus, after the rotational speed of the development roller 44 has reached the same speed as the speed at the image forming timing, at least before the photosensitive drum 1 rotates once (216 msec in the second exemplary embodiment), the change of the charging potential Vd of the photosensitive drum 1 (change of charging DC bias) at the facing position facing the development roller 44 is started. With this configuration, at least after the photosensitive drum 1 rotates once since the time point at which the rotational speed of the development roller 44 has reached the same speed as the speed at the image forming timing, the potential difference Vback is changed to the same value as the value at the image forming timing. With this configuration, an image forming operation start point is not delayed more than necessary, to change the potential difference Vback (change the charging DC bias) after the rotational speed of the development roller 44 has reached the same speed as the speed at the image forming timing. It is therefore possible to prevent a productivity decline.

In view of the foregoing, in the second exemplary embodiment, as illustrate din FIG. 4, a time t after the rotational speed of the development roller 44 has reached the same speed as the speed at the image forming timing, until the change of the charging potential Vd of the photosensitive drum 1 is started is set as follows. More specifically, the time t is controlled to become a time equal to or larger than 100 msec and smaller than a time required for the photosensitive drum 1 rotating once, from the time point at which the rotational speed of the development roller 44 has reached the same speed as the speed at the image forming timing.

With this configuration, in the second exemplary embodiment, it is possible to prevent a productivity decline while suppressing carrier adhesion and fogging toner before the start of an image forming operation. In the second exemplary embodiment, similarly to the first exemplary embodiment, it is possible to suppress fogging toner at an image forming timing while suppressing carrier adhesion during a period from when the rotational drive of the development roller 44 has been started, until the rotational speed of the development roller 44 reaches the speed at the image forming timing.

Subsequently, a third exemplary embodiment will be described. A basic configuration of the third exemplary embodiment is the same as that of the first exemplary embodiment. Thus, the component having a function and a configuration that are substantially the same as or equivalent to those in the first exemplary embodiment is assigned the same reference numeral, and the detailed description thereof will be omitted, and only a component unique to the third exemplary embodiment will be described in detail.

Figure 5:
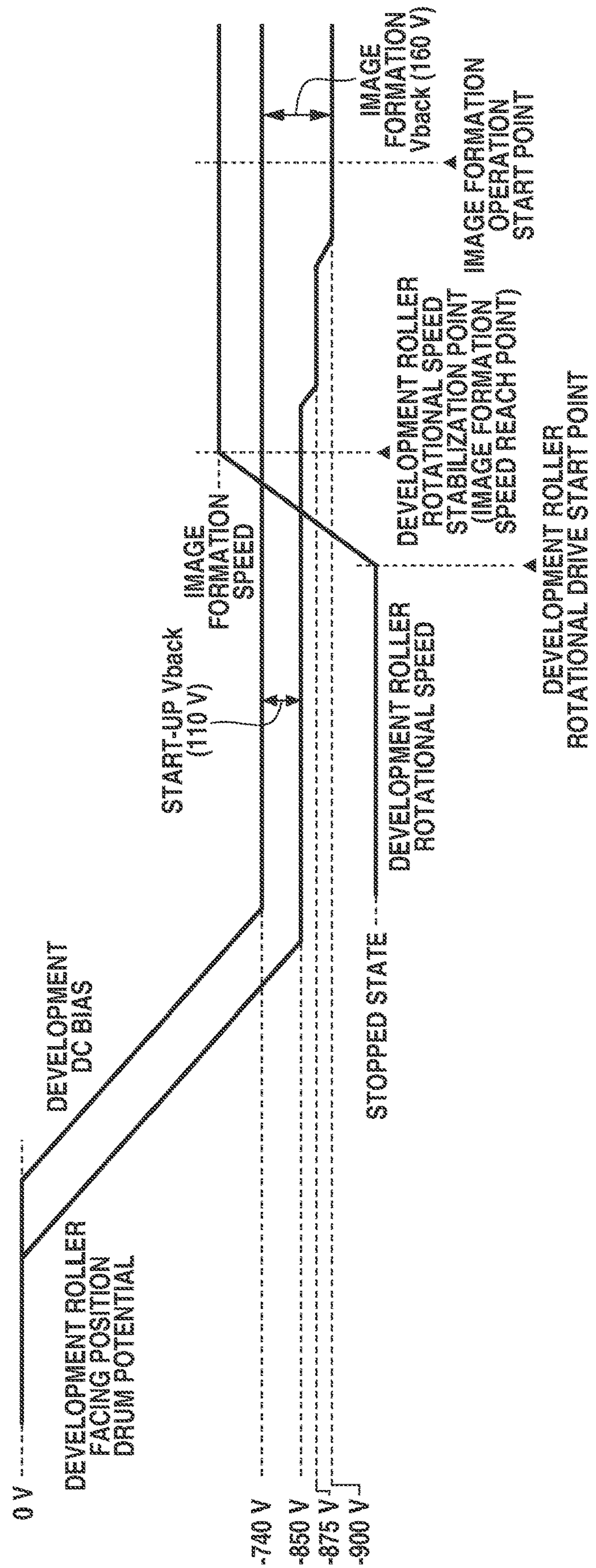
FIG. 5 is a diagram illustrating a sequence of an image forming operation (image formation operation) according to a third exemplary embodiment.

A sequence of an image forming operation (image formation operation) according to the third exemplary embodiment will be described with reference to FIG. 5. FIG. 5 illustrates the rotational drive of the development roller 44 at a start timing of an image formation operation, a development DC bias applied to the development roller 44, a value of the charging potential Vd at a facing position at which the photosensitive drum 1 faces the development roller 44, and a timing chart according to the third exemplary embodiment.

In the first exemplary embodiment described above, the charging potential Vd of the photosensitive drum 1 is changed from the first charging potential Vd1 to the second charging potential Vd2 so that the potential difference Vback becomes the same potential difference Vback as the potential difference Vback at the image forming timing after the lapse of a certain period of time since the rotational speed of the development roller 44 has reached the same speed as the speed at the image forming timing. Specifically, the first charging potential Vd1 is −850 V and the second charging potential Vd2 is −900 V.

Nevertheless, in a case where a rapid change occurs in the charging potential Vd on the photosensitive drum 1 by changing the charging potential Vd of the photosensitive drum 1 in a short time as in the first exemplary embodiment, carrier adhesion or fogging toner might occur at the change position of the charging potential Vd on the photosensitive drum 1.

In view of the foregoing, in the third exemplary embodiment, as illustrated in FIG. 5, a potential difference Vback during a period after the rotational speed of the development roller 44 has reached the same speed as the speed at the image forming timing, until an image forming operation is started is controlled to become a value different from the start-up Vback and the image formation Vback. Specifically, an absolute value of the potential difference Vback during a period after the rotational speed of the development roller 44 has reached the same speed as the speed at the image forming timing, until an image forming operation is started is made larger than an absolute value of the start-up Vback and made smaller than an absolute value of the image formation Vback. The start-up Vback refers to a potential difference Vback during a period from when the rotational drive of the development roller 44 has been started, until the rotational speed of the development roller 44 reaches the speed at the image forming timing. The image formation Vback refers to a potential difference Vback at the image forming timing (after an image forming operation start point).

With this configuration, in the third exemplary embodiment, it is possible to reduce a rapid change in the charging potential Vd on the photosensitive drum 1, and suppress carrier adhesion and fogging toner. In the third exemplary embodiment, similarly to the first exemplary embodiment, it is possible to suppress fogging toner at an image forming timing while suppressing carrier adhesion during a period from when the rotational drive of the development roller 44 has been started, until the rotational speed of the development roller 44 reaches the speed at the image forming timing.

Subsequently, a fourth exemplary embodiment will be described. A basic configuration of the fourth exemplary embodiment is the same as that of the first exemplary embodiment. Thus, the component having a function and a configuration that are substantially the same as or equivalent to those in the first exemplary embodiment is assigned the same reference numeral, and the detailed description thereof will be omitted, and only a component unique to the fourth exemplary embodiment will be described in detail.

Figure 6:
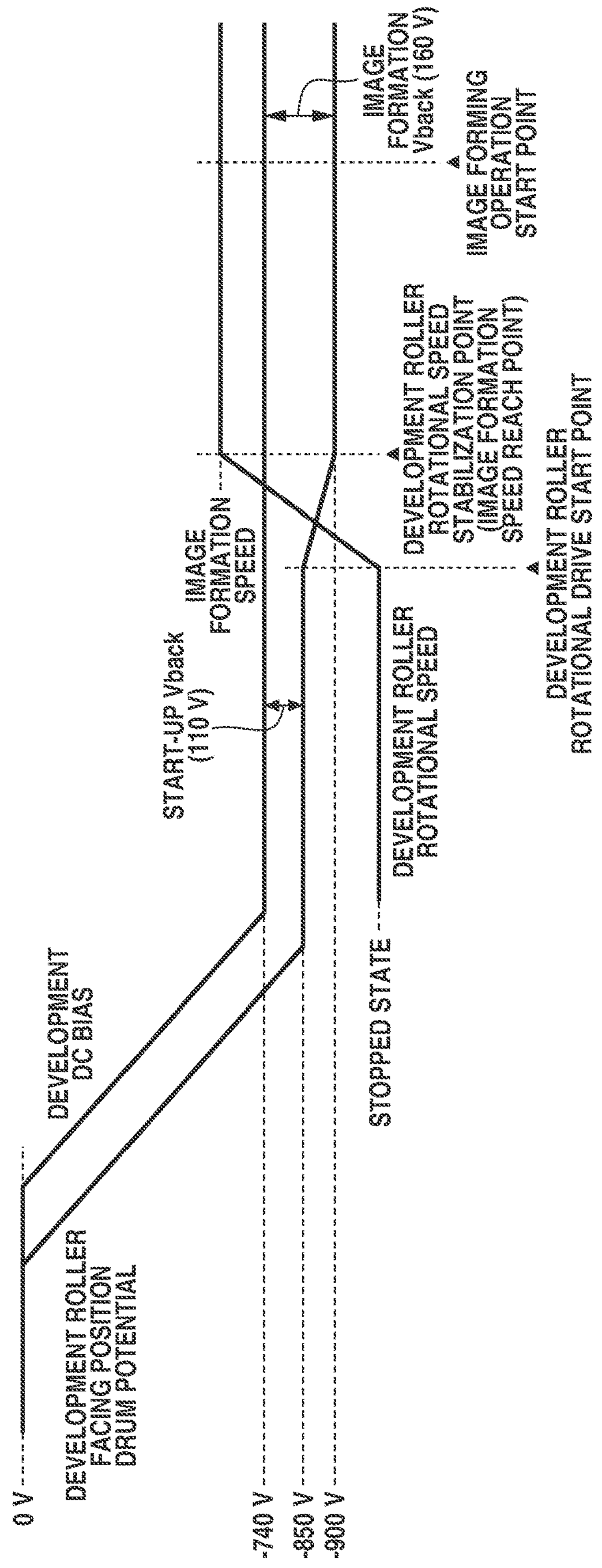
FIG. 6 is a diagram illustrating a sequence of an image forming operation (image formation operation) according to a fourth exemplary embodiment.

A sequence of an image forming operation (image formation operation) according to the fourth exemplary embodiment will be described with reference to FIG. 6. FIG. 6 illustrates the rotational drive of the development roller 44 at a start timing of an image formation operation, a development DC bias applied to the development roller 44, a value of the charging potential Vd at a facing position at which the photosensitive drum 1 faces the development roller 44, and a timing chart according to the fourth exemplary embodiment.

In the first exemplary embodiment described above, during a period from when the rotational drive of the development roller 44 has been started, until the rotational speed of the development roller 44 reaches the same speed as the speed at the image forming timing, the potential difference Vback is controlled at a constant value.

Nevertheless, the value of the potential difference Vback optimum for carrier adhesion and fogging toner varies depending on the rotational speed of the development roller 44. In particular, immediately after the rotational drive of the development roller 44 has been started, because the rotational speed of the development roller 44 is slower than the speed at the image forming timing, the potential difference Vback is larger than an optimum value, and carrier adhesion might occur. Immediately before the rotational speed of the development roller 44 reaches the same speed as the speed at the image forming timing, the potential difference Vback is smaller than the optimum value, and fogging toner might occur.

In view of the foregoing, in the fourth exemplary embodiment, as illustrated in FIG. 6, by controlling the potential difference Vback in accordance with the rotational speed of the development roller 44 rotationally driven by a drive unit (development motor), carrier adhesion and fogging toner are suppressed.

In the fourth exemplary embodiment, as for an operation to be performed before the rotational drive of the development roller 44 is started, control similar to that in the first exemplary embodiment is performed. Thus, the description of the operation to be performed before the rotational drive of the development roller 44 is started is omitted, and an operation to be performed after the rotational drive of the development roller 44 is started will be described in detail below.

After the lapse of a certain period of time since a development DC bias has been applied to the development roller 44, a first charging potential (Vd1=−850 V) of the photosensitive drum 1 and the development DC bias (Vdc=−740 V) enter a stable state, and the rotational drive of the development roller 44 is started. The potential difference Vback (start-up Vback) at the time is 110 V.

The rotational speed of the development roller 44 increases from a time point at which the rotational drive of the development roller 44 is started, up to a time point at which the rotational speed of the development roller 44 has reached the same speed as the speed at the image forming timing. Accordingly, in accordance with the increase in the rotational speed of the development roller 44, a charging DC bias is gradually changed so that the charging potential Vd of the photosensitive drum 1 becomes a second charging potential (Vd2=−900 V). A potential difference Vback at a time point at which the gradual change in the charging DC bias has ended becomes 160 V.

With this configuration, it is possible to control the potential difference Vback to become an optimum potential difference Vback suitable for the rotational speed of the development roller 44. It is therefore possible to suppress carrier adhesion and fogging toner during a period from when the rotational drive of the development roller 44 has been started, until the rotational speed reaches the same speed as the speed at the image forming timing.

With this configuration, in the fourth exemplary embodiment, it is possible to reduce a rapid change in the charging potential Vd on the photosensitive drum 1, and suppress carrier adhesion and fogging toner. In the fourth exemplary embodiment, similarly to the first exemplary embodiment, it is possible to suppress fogging toner at an image forming timing while suppressing carrier adhesion during a period from when the rotational drive of the development roller 44 has been started, until the rotational speed of the development roller 44 reaches the speed at the image forming timing.

The first exemplary embodiment described above focuses attention on suppressing fogging toner at an image forming timing while suppressing carrier adhesion during a period from when the rotational drive of the development roller 44 has been started, until the rotational speed of the development roller 44 reaches the speed at the image forming timing.

In contrast to this, a fifth exemplary embodiment focuses attention on suppressing fogging toner at an image forming timing while suppressing carrier adhesion during a period from when the rotational speed of the development roller 44 has started to decelerate from the speed at the image forming timing, until the rotational speed of the development roller 44 becomes zero.

A basic configuration of the fifth exemplary embodiment is the same as that of the first exemplary embodiment. Thus, the component having a function and a configuration that are substantially the same as or equivalent to those in the first exemplary embodiment is assigned the same reference numeral, and the detailed description thereof will be omitted, and only a component unique to the fifth exemplary embodiment will be described in detail.

Conventional Example

Figure 13:
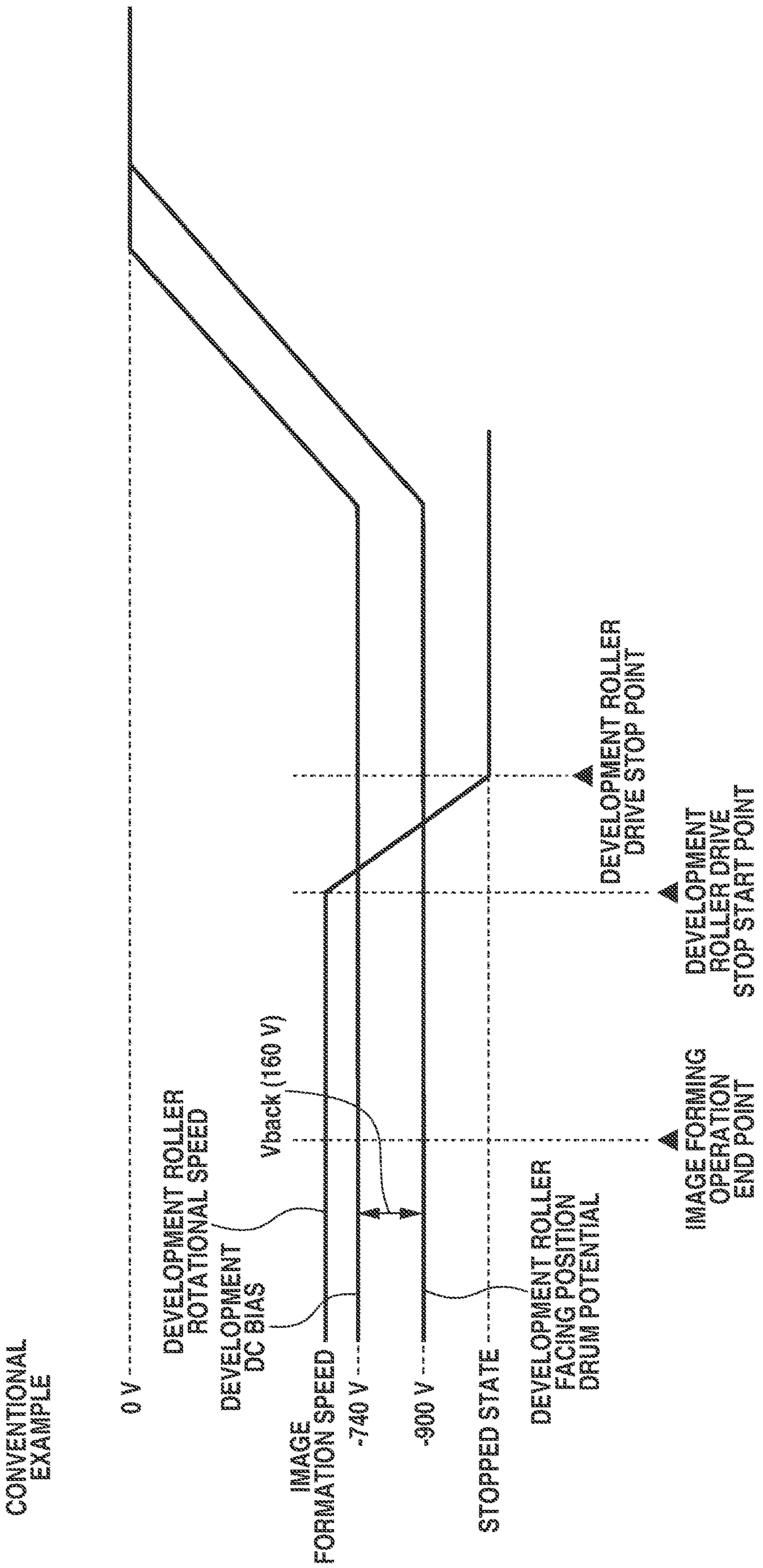
FIG. 13 is a diagram illustrating a sequence of an image forming operation (image formation operation) according to a conventional example.

Precedential to the description of a sequence of an image forming operation (image formation operation) according to the fifth exemplary embodiment, a sequence of an image formation operation according to a conventional example will be described with reference to FIG. 13. FIG. 13 illustrates the rotational drive of the development roller 44 from a halfway timing of an image formation operation to an image formation operation end, a development DC bias applied to the development roller 44, a value of the charging potential Vd at a facing position at which the photosensitive drum 1 faces the development roller 44, and a timing chart according to the conventional example.

As illustrated in FIG. 13, during an image formation operation, a charging bias is applied to the charging roller 2A by a high voltage power source (charging bias application unit), and the photosensitive drum 1 is uniformly charged (Vd=−900 V) at a facing position at which the photosensitive drum 1 faces the development roller 44. In addition, a development DC bias (Vdc=−740 V) is applied to the development roller 44 by a high voltage power source (development bias application unit). The charging potential Vd of the photosensitive drum 1 and the development DC bias Vdc are in a stable state, and a potential difference Vback being a fogging-removing potential difference at the time is 160 V.

If an image formation operation (image forming) ends, the rotational drive of the development roller 44 starts to stop, and the rotational speed of the development roller 44 starts to decelerate, but the potential difference Vback (=160 V) being a fogging-removing potential difference at the time remains at the same value as that at the image forming timing.

Then, after the rotational speed of the development roller 44 becomes zero (after a development roller drive stop point), the application of the charging bias to the charging roller 2A by the high voltage power source (charging bias application unit) starts to stop (an absolute value of the charging bias to the charging roller 2A starts to uniformly decrease). If the position of the photosensitive drum 1 at which the application of the charging bias starts to stop reaches the facing position facing the development roller 44, by the rotation of the photosensitive drum 1, the application of the development DC bias to the development roller 44 by the high voltage power source (development bias application unit) starts to stop.

Carrier adhesion amounts and fogging toner amounts obtained when an absolute value of the potential difference Vback was changed to 60 V, 110 V, 160 V, and 210 V in the operation according to the conventional example were measured. Table 3 indicates measurement results of carrier adhesion amounts and fogging toner amounts obtained when an absolute value of the potential difference Vback at an image forming timing was changed in the operation according to the conventional example. In addition, an absolute value of the potential difference Vback during a period from when the rotational speed of the development roller 44 has started to decelerate from the speed at the image forming timing, until the rotational drive of the development roller 44 stops was changed in the operation according to the conventional example. Table 4 indicates measurement results of carrier adhesion amounts and fogging toner amounts obtained at the time. The period from when the rotational speed of the development roller 44 has started to decelerate from the speed at the image forming timing, until the rotational drive of the development roller 44 stops means a period from when the rotational drive of the development roller 44 has started to stop, until the rotational speed of the development roller 44 becomes zero.

As for items of carrier adhesion in Tables 3 and 4, “acceptable” indicates that the degree of carrier adhesion is at a level allowable as image quality, and “unacceptable” indicates that the degree of carrier adhesion is at a level unallowable as image quality. As for items of fogging toner In Tables 3 and 4, “acceptable” indicates that the degree of fogging toner is at a level allowable as image quality, and “unacceptable” indicates that the degree of fogging toner is at a level unallowable as image quality. The level unallowable as image quality means that an image defect occurs.

TABLE 3

| | Vback at image forming | | | |
|---|---|---|---|---|
| | 60 V | 110 V | 160 V | 210 V |
| Carrier adhesion | Acceptable | Acceptable | Acceptable | Unacceptable |
| Fogging toner | Unacceptable | Unacceptable | Acceptable | Acceptable |

TABLE 4

| | Vback from start to stop of drive stop of development roller | | | |
|---|---|---|---|---|
| | 60 V | 110 V | 160 V | 210 V |
| Carrier adhesion | Acceptable | Acceptable | Unacceptable | Unacceptable |
| Fogging toner | Unacceptable | Acceptable | Acceptable | Acceptable |

In this experiment, during the formation of a blank image (i.e., image with an image ratio of 0%) using the image forming apparatus 100, an operation is suspended, and a carrier and fogging toner that adhere onto the photosensitive drum 1 were collected using a tape. The carrier adhesion amount was obtained by counting the number of carrier particles in a region of 3 cm×3 cm, and calculating the number of adhering carrier particles per square centimeter. As the fogging toner amount, a density was measured using the X-Rite 500 series color reflection densitometer manufactured by the X-Rite, Inc.

At the image forming timing, in a case where the potential difference Vback is 210 V or more, the degree of carrier adhesion becomes a level unallowable as image quality. In contrast to this, during a period from when the rotational speed of the development roller 44 has started to decelerate from the speed at an image forming timing, until the rotational speed of the development roller 44 becomes zero, in a case where the potential difference Vback is 160 V or more, the degree of carrier adhesion becomes a level unallowable as image quality. On the other hand, as for fogging toner, at the image forming timing, in a case where the potential difference Vback is 110 V or less, the degree of fogging toner becomes a level unallowable as image quality. In contrast to this, during the period from when the rotational speed of the development roller 44 has started to decelerate from the speed at an image forming timing, until the rotational speed of the development roller 44 becomes zero, in a case where the potential difference Vback is 60 V or less, the degree of fogging toner becomes a level unallowable as image quality. From the above-described results, it can be seen that an optimum potential difference Vback by which image defects attributed to carrier adhesion and fogging toner do not occur varies between an image forming timing and the period from when the rotational speed of the development roller 44 has started to decelerate from the speed at the image forming timing, until the rotational speed of the development roller 44 becomes zero.

Figure 8:
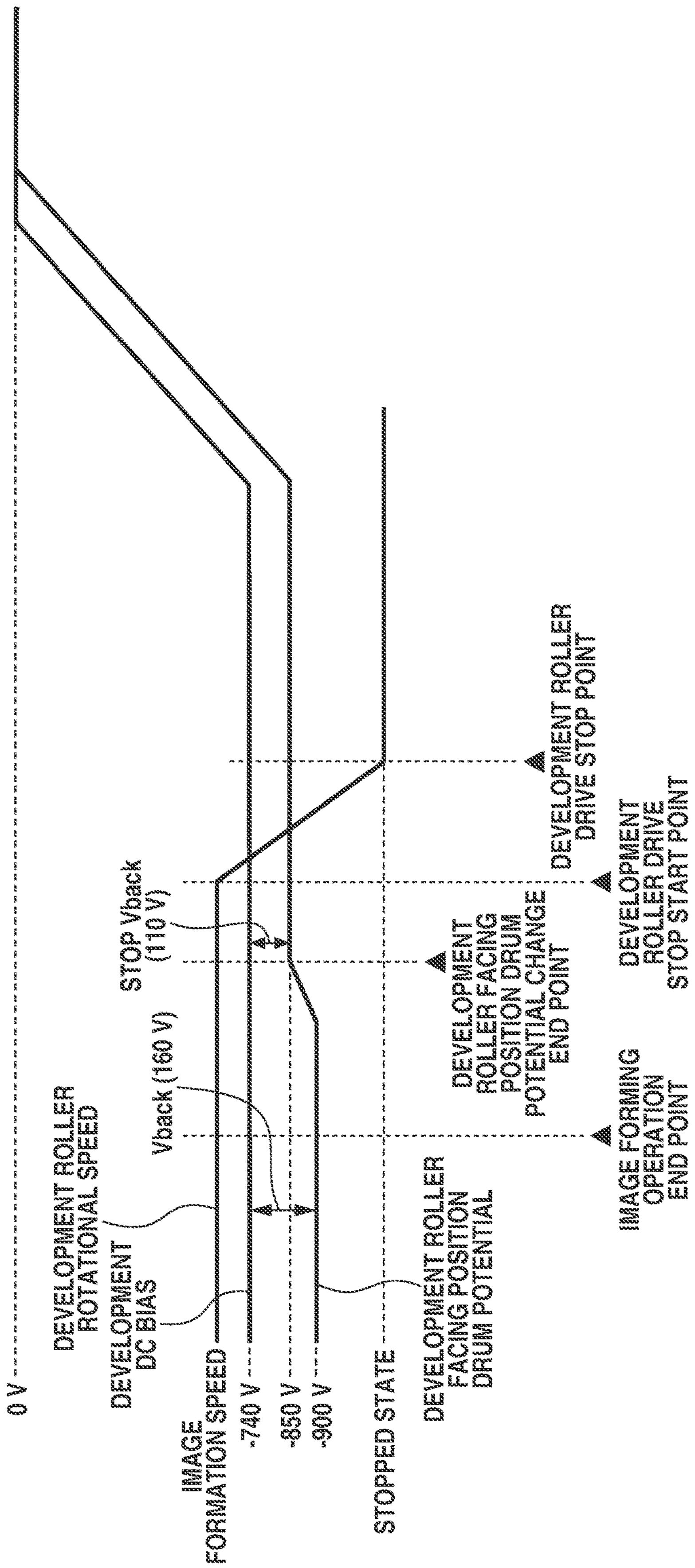
FIG. 8 is a diagram illustrating a sequence of an image forming operation (image formation operation) according to a fifth exemplary embodiment.

Subsequently, a sequence of an image forming operation (image formation operation) according to the fifth exemplary embodiment will be described with reference to FIG. 8. FIG. 8 illustrates the rotational drive of the development roller 44 from a halfway timing of an image formation operation to an image formation operation end, a development DC bias applied to the development roller 44, a value of the charging potential Vd at a facing position at which the photosensitive drum 1 faces the development roller 44, and a timing chart according to the fifth exemplary embodiment.

As illustrated in FIG. 8, during an image formation operation, a charging bias is applied to the charging roller 2A by a high voltage power source (charging bias application unit), and the photosensitive drum 1 is uniformly charged (Vd=−900 V) at a facing position at which the photosensitive drum 1 faces the development roller 44. In addition, a development DC bias (Vdc=−740 V) is applied to the development roller 44 by a high voltage power source (development bias application unit).

The charging potential Vd of the photosensitive drum 1 and the development DC bias Vdc are in a stable state, and a potential difference Vback (image formation Vback) being a fogging-removing potential difference at the time is 160 V.

If an image formation operation ends, a charging bias to be applied to the charging roller 2A is changed and set so that the charging potential Vd of the photosensitive drum 1 becomes Vd=−850 V at the facing position facing the development roller 44. After the charging potential Vd of the photosensitive drum 1 becomes Vd=−850 V at the facing position facing the development roller 44, the rotational speed of the development roller 44 starts to decelerate, and a potential difference Vback being a fogging-removing potential difference at the time is 110 V. In FIG. 8, a potential difference Vback during a period from when the rotational speed of the development roller 44 has started to decelerate from the speed at the image forming timing, until the rotational speed of the development roller 44 becomes zero is described as a “stop Vback”.

After the rotational drive of the development roller 44 has stopped (i.e., after the rotational speed of the development roller 44 has become zero), the application of a charging bias to the charging roller 2A by the high voltage power source (charging bias application unit) starts to stop (an absolute value of the charging bias to the charging roller 2A starts to uniformly decrease). Then, if the position at which the application of the charging bias to the photosensitive drum 1 by the charging bias application unit starts to stop reaches the facing position facing the development roller 44, by the rotation of the photosensitive drum 1, the application of the development DC bias to the development roller 44 by the development bias application unit starts to stop.

By executing the control illustrated in FIG. 8, carrier adhesion can be suppressed by setting a potential difference Vback (stop Vback) to 110 V during the period from when the rotational speed of the development roller 44 has started to decelerate from the speed at the image forming timing, until the rotational speed of the development roller 44 becomes zero. In addition, fogging toner and carrier adhesion at the image forming timing can be suppressed by setting a potential difference Vback (image formation Vback) to 160 V at the image forming timing.

In the fifth exemplary embodiment described above, the stop Vback is made smaller than the image formation Vback. According to the fifth exemplary embodiment as described above, it is possible to suppress fogging toner at an image forming timing while suppressing carrier adhesion during period from when the rotational speed of the development roller 44 has started to decelerate from the speed at the image forming timing, until the rotational speed of the development roller 44 becomes zero.

Referring to FIG. 8, the description has been given of an example of control in which a charging DC bias is changed with a development DC bias (Vdc=−740 V) to the development roller 44 being kept constant, when a potential difference Vback is changed from the image formation Vback to the stop Vback, but the control is not limited to this. As long as the stop Vback is smaller than the image formation Vback, a modified example of also changing a development DC bias in addition to changing a charging DC bias may be applied.

Subsequently, a sixth exemplary embodiment will be described. A basic configuration of the sixth exemplary embodiment is the same as that of the fifth exemplary embodiment. Thus, the component having a function and a configuration that are substantially the same as or equivalent to those in the fifth exemplary embodiment is assigned the same reference numeral, and the detailed description thereof will be omitted, and only a component unique to the sixth exemplary embodiment will be described in detail.

Figure 9:
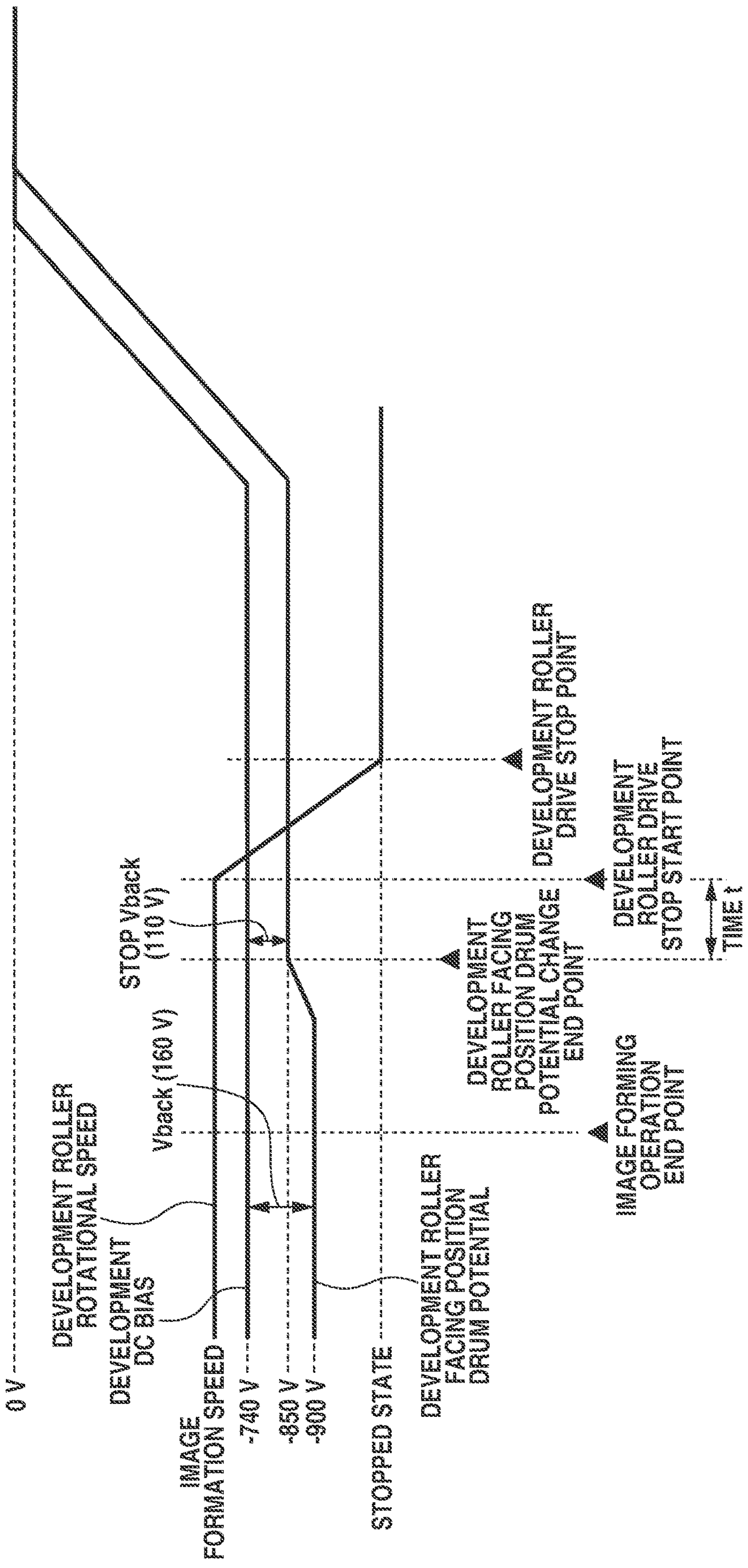
FIG. 9 is a diagram illustrating a sequence of an image forming operation (image formation operation) according to a sixth exemplary embodiment.

A sequence of an image forming operation (image formation operation) according to the sixth exemplary embodiment will be described with reference to FIG. 9. FIG. 9 illustrates the rotational drive of the development roller 44 from a halfway timing of an image formation operation to an image formation operation end, a development DC bias applied to the development roller 44, a value of the charging potential Vd at a facing position at which the photosensitive drum 1 faces the development roller 44, and a timing chart according to the sixth exemplary embodiment.

In the fifth exemplary embodiment described above, after the charging potential Vd of the photosensitive drum 1 becomes Vd=−850 V (after the potential difference Vback is set to 110 V) at the facing position facing the development roller 44, the rotational drive of the development roller 44 starts to decelerate. Nevertheless, in a case where the rotational drive of the development roller 44 starts to decelerate immediately after the charging potential Vd of the photosensitive drum 1 becomes Vd=−850 V at the facing position facing the development roller 44, the rotational speed of the development roller 44 might be changed in a state in which the potential of the photosensitive drum 1 is not stabilized sufficiently. In such a state, because the potential difference Vback is not controlled to become the optimum Vback in the suppression of carrier adhesion and fogging toner with respect to the rotational speed of the development roller 44, carrier adhesion or fogging toner might occur.

On the other hand, after the lapse of a margin time (about 100 msec in the sixth exemplary embodiment) until the charging potential Vd of the photosensitive drum 1 is stablished, the potential of the photosensitive drum 1 is stablished sufficiently. It is therefore desirable that the rotational drive of the development roller 44 starts to decelerate after the lapse of 100 msec since a charged position of the photosensitive drum 1 reaches the facing position facing the development roller 44 after the potential difference Vback has been changed to 110 V. That is to say, after image forming ends, a charged position of the photosensitive drum 1 to which a charging bias has been applied so that the surface potential of the photosensitive drum 1 becomes Vd=−850 V reaches a position at which the photosensitive drum 1 faces the development roller 44. It is desirable that the rotational speed of the development roller 44 starts to decelerate from the speed at the image forming timing, after 100 msec or more since the reach time point, and until the photosensitive drum 1 rotates once since the reach time point.

On the other hand, from the viewpoint of productivity, it is desirable to execute a stop operation after image forming in a short time.

Thus, after a charged position of the photosensitive drum 1 reaches the facing position facing the development roller 44 after the potential difference Vback has been changed to 110 V, at least before the photosensitive drum 1 rotates once (216 msec in the sixth exemplary embodiment), the rotational drive of the development roller 44 starts to decelerate. With this configuration, a deceleration start timing of the rotational drive of the development roller 44 (drive stop start point of the development roller 44) is not delayed more than necessary. It is therefore possible to prevent a productivity decline.

In view of the foregoing, in the sixth exemplary embodiment, as illustrated in FIG. 9, a time t after a charged position of the photosensitive drum 1 reaches the facing position facing the development roller 44 after the potential difference Vback has been changed to 110 V, until the rotational drive of the development roller 44 starts to decelerate is set as follows. More specifically, the time t is controlled to become a time equal to or larger than 100 msec and smaller than a time required for the photosensitive drum 1 rotating once, from the time point at which a charged position of the photosensitive drum 1 has reached the facing position facing the development roller 44 after the potential difference Vback has been changed to 110 V. In FIG. 9, the time point at which a charged position of the photosensitive drum 1 has reached the facing position facing the development roller 44 after the potential difference Vback has been changed to 110 V is described as a "development roller facing position drum potential change end point".

In the sixth exemplary embodiment, after image forming ends, a charged position of the photosensitive drum 1 to which a charging bias has been applied so that the surface potential of the photosensitive drum 1 becomes Vd=−850 V reaches a position at which the photosensitive drum 1 faces the development roller 44. A drive motor is controlled so that the rotational speed of the development roller 44 starts to decelerate from the speed at the image forming timing, after 100 msec or more since the reach time point, and until the photosensitive drum 1 rotates once since the reach time point.

With this configuration, in the sixth exemplary embodiment, a deceleration start timing of the rotational drive of the development roller 44 (drive stop start point of the development roller 44) is not delayed more than necessary. It is therefore possible to prevent a productivity decline. In the sixth exemplary embodiment, similarly to the fifth exemplary embodiment, it is possible to suppress fogging toner at an image forming timing while suppressing carrier adhesion during a period from when the rotational speed of the development roller 44 has started to decelerate from the speed at the image forming timing, until the rotational speed of the development roller 44 becomes zero.

Subsequently, a seventh exemplary embodiment will be described. A basic configuration of the seventh exemplary embodiment is the same as that of the fifth exemplary embodiment. Thus, the component having a function and a configuration that are substantially the same as or equivalent to those in the fifth exemplary embodiment is assigned the same reference numeral, and the detailed description thereof will be omitted, and only a component unique to the seventh exemplary embodiment will be described in detail.

Figure 10:
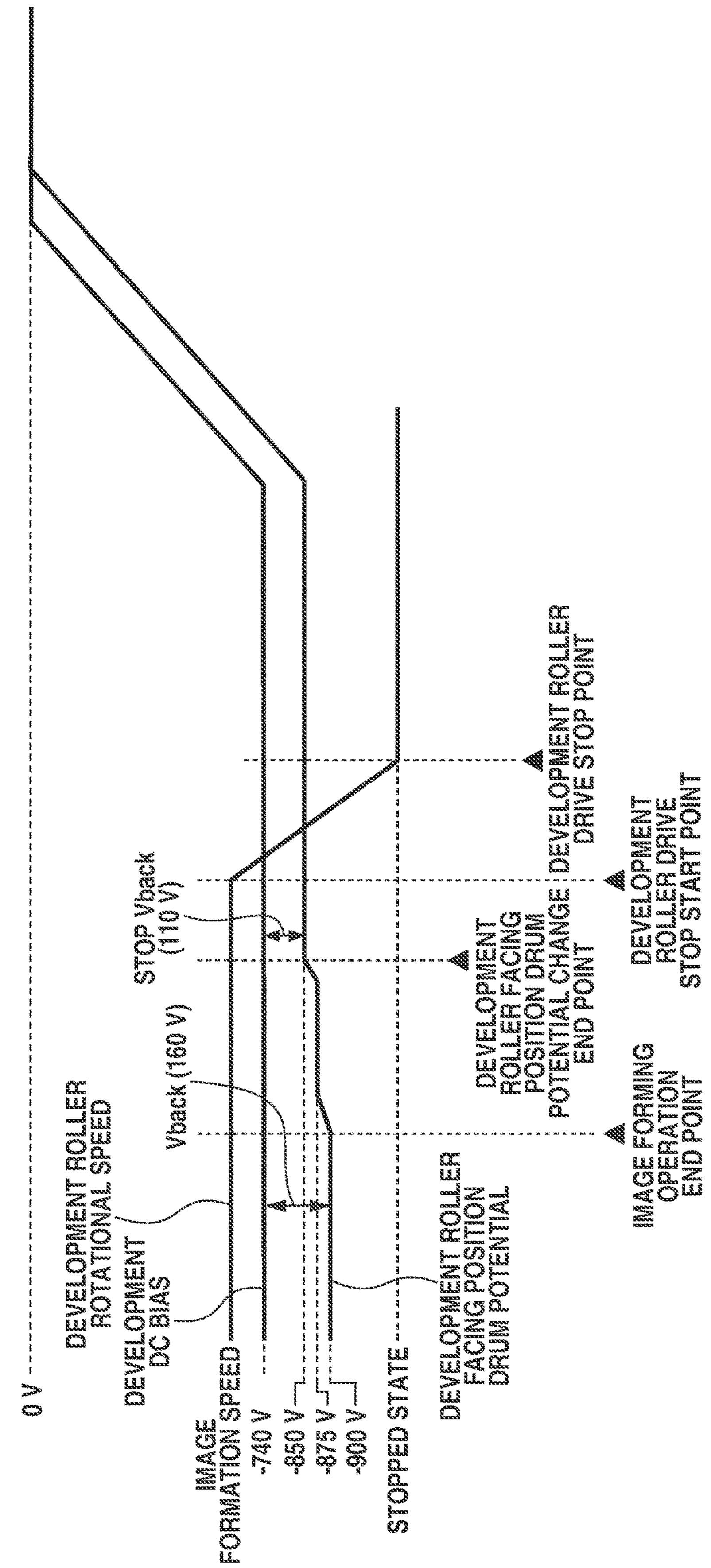
FIG. 10 is a diagram illustrating a sequence of an image forming operation (image formation operation) according to a seventh exemplary embodiment.

A sequence of an image forming operation (image formation operation) according to the seventh exemplary embodiment will be described with reference to FIG. 10. FIG. 10 illustrates the rotational drive of the development roller 44 from a halfway timing of an image formation operation to an image formation operation end, a development DC bias applied to the development roller 44, a value of the charging potential Vd at a facing position at which the photosensitive drum 1 faces the development roller 44, and a timing chart according to the seventh exemplary embodiment.

In the fifth exemplary embodiment described above, when an image formation operation ends, the charging potential Vd of the photosensitive drum 1 in image formation is changed from the first charging potential (Vd1=−900 V) to the second charging potential (Vd2=−850 V). Nevertheless, in a case where a rapid change occurs in the charging potential Vd on the photosensitive drum 1 by changing the charging potential Vd of the photosensitive drum 1 in a short time, carrier adhesion or fogging toner might occur at the change position of the charging potential Vd on the photosensitive drum 1.

In view of the foregoing, in the seventh exemplary embodiment, as illustrated in FIG. 10, a potential difference Vback during a period from when an image formation operation ends, until the rotational drive of the development roller 44 starts to decelerate (period from an image forming operation end point to a development roller drive stop start point) is set as follows. More specifically, the potential difference Vback during the period is controlled to become a value different from a potential difference Vback1 at an image forming timing, and a potential difference Vback2 during a period from when the rotational speed of the development roller 44 starts to decelerate from the speed at the image forming timing, until the rotational speed of the development roller 44 becomes zero (period from a development roller drive stop start point to a development roller drive stop point). It is desirable to set the potential difference Vback during a period from when an image formation operation ends, until the rotational drive of the development roller 44 starts to decelerate, to a potential difference equal to or larger than the potential difference Vback2 during the period from when the rotational speed of the development roller 44 starts to decelerate from the speed at the image forming timing, until the rotational speed of the development roller 44 becomes zero, and equal to or smaller than the potential difference Vback1 at the image forming timing.

In the example illustrated in FIG. 10, the potential difference Vback during the period from when an image formation operation ends, until the rotational drive of the development roller 44 starts to decelerate is achieved by changing the charging potential Vd of the photosensitive drum 1 while keeping the development DC bias Vdc to the development roller 44 constant. Then, an absolute value of the potential difference Vback during the period from when an image formation operation ends, until the rotational drive of the development roller 44 starts to decelerate is made larger than an absolute value of the stop Vback, and made smaller than an absolute value of the image formation Vback (Vback1). The stop Vback refers to a potential difference Vback (Vback2) during the period from when the rotational speed of the development roller 44 has started to decelerate from the speed at the image forming timing, until the rotational speed of the development roller 44 becomes zero. The image formation Vback refers to a potential difference Vback (Vback1) at an image forming timing (after an image forming operation start point).

With this configuration, in the seventh exemplary embodiment, it is possible to reduce a rapid change in the charging potential Vd on the photosensitive drum 1, and suppress carrier adhesion and fogging toner. In the seventh exemplary embodiment, similarly to the fifth exemplary embodiment, it is possible to suppress fogging toner at an image forming timing while suppressing carrier adhesion during a period from when the rotational speed of the development roller 44 has started to decelerate from the speed at the image forming timing, until the rotational speed of the development roller 44 becomes zero.

Subsequently, an eighth exemplary embodiment will be described. A basic configuration of the eighth exemplary embodiment is the same as that of the fifth exemplary embodiment. Thus, the component having a function and a configuration that are substantially the same as or equivalent to those in the fifth exemplary embodiment is assigned the same reference numeral, and the detailed description thereof will be omitted, and only a component unique to the eighth exemplary embodiment will be described in detail.

Figure 11:
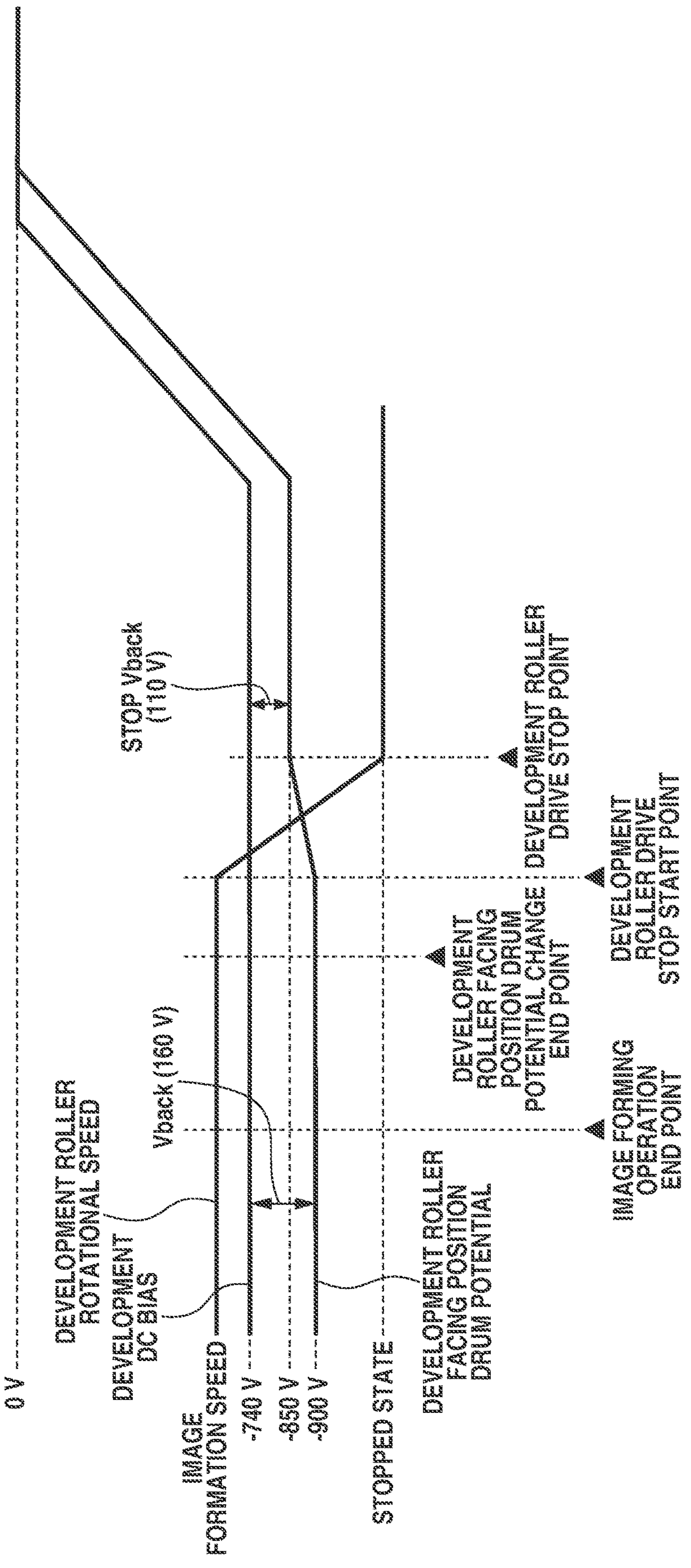
FIG. 11 is a diagram illustrating a sequence of an image forming operation (image formation operation) according to an eighth exemplary embodiment.

A sequence of an image forming operation (image formation operation) according to the eighth exemplary embodiment will be described with reference to FIG. 11. FIG. 11 illustrates the rotational drive of the development roller 44 from a halfway timing of an image formation operation to an image formation operation end, a development DC bias applied to the development roller 44, a value of the charging potential Vd at a facing position at which the photosensitive drum 1 faces the development roller 44, and a timing chart according to the eighth exemplary embodiment.

In the fifth exemplary embodiment described above, the potential difference Vback is controlled at a constant value during a period from when the rotational speed of the development roller 44 has started to decelerate from the speed at the image forming timing, until the rotational speed of the development roller 44 becomes zero. Nevertheless, the value of the potential difference Vback optimum for carrier adhesion and fogging toner varies depending on the rotational speed of the development roller 44. In particular, immediately after the rotational drive of the development roller 44 has started to stop, because the rotational speed of the development roller 44 is slower than the speed at the image forming timing, the potential difference Vback is smaller than an optimum value, and fogging toner might occur. Immediately before the rotational speed of the development roller 44 becomes zero, the potential difference Vback is larger than the optimum value, and carrier adhesion might occur.

In view of the foregoing, in the eighth exemplary embodiment, as illustrated in FIG. 11, by controlling the potential difference Vback in accordance with the rotational speed of the development roller 44 rotationally driven by a drive unit (development motor), carrier adhesion and fogging toner are suppressed.

In the eighth exemplary embodiment, as for an operation to be performed from when an image formation operation ends, until the rotational drive of the development roller 44 starts to stop, control similar to that in the fifth exemplary embodiment is performed. Thus, the description of the operation to be performed from when an image formation operation ends, until the rotational drive of the development roller 44 starts to stop is omitted, and an operation to be performed from when the rotational speed of the development roller 44 starts to decelerate from the speed at the image forming timing, until the rotational speed of the development roller 44 becomes zero will be described in detail below.

At the time point at which an image formation operation ends, the first charging potential (Vd1=−900 V) of the photosensitive drum 1 and the development DC bias (Vdc=−740 V) enter a stable state, and the rotational drive of the development roller 44 starts to stop in this state. The potential difference Vback at this time is 160 V.

After the rotational speed of the development roller 44 starts to decelerate from the speed at the image forming timing, in accordance with a decrease in the rotational speed of the development roller 44, a charging DC bias is gradually changed so that the charging potential Vd of the photosensitive drum 1 is changed from the first charging potential to the second charging potential. Specifically, after the rotational speed of the development roller 44 starts to decelerate from the speed at the image forming timing, in accordance with the decrease in the rotational speed of the development roller 44, a charging DC bias is gradually changed so that the charging potential Vd of the photosensitive drum 1 is changed from −900 V to −850 V. Then, a potential difference Vback at a time point at which the gradual change in the charging DC bias has ended becomes 110 V.

In FIG. 11, a time point at which the rotational drive of the development roller 44 has stopped (i.e., time point at which the rotational speed of the development roller 44 has become zero) is described as a "development roller drive stop point". In FIG. 11, a potential difference Vback after the rotational drive of the development roller 44 has stopped is described as a "post-stop Vback".

In the eighth exemplary embodiment, by executing the control illustrated in FIG. 11, the potential difference Vback can be controlled to become an optimum potential difference Vback suitable for the rotational speed of the development roller 44. Thus, in the eighth exemplary embodiment, it is possible to suppress carrier adhesion and fogging toner during a period from when the rotational drive of the development roller 44 has started to stop, until the rotational drive of the development roller 44 stops (the rotational speed of the development roller 44 becomes zero). In the eighth exemplary embodiment, similarly to the fifth exemplary embodiment, it is possible to suppress fogging toner at an image forming timing while suppressing carrier adhesion during a period from when the rotational speed of the development roller 44 has started to decelerate from the speed at the image forming timing, until the rotational speed of the development roller 44 becomes zero.

Subsequently, a ninth exemplary embodiment will be described. A basic configuration of the ninth exemplary embodiment is the same as that of the fifth exemplary embodiment. Thus, the component having a function and a configuration that are substantially the same as or equivalent to those in the fifth exemplary embodiment is assigned the same reference numeral, and the detailed description thereof will be omitted, and only a component unique to the ninth exemplary embodiment will be described in detail.

Figure 12:
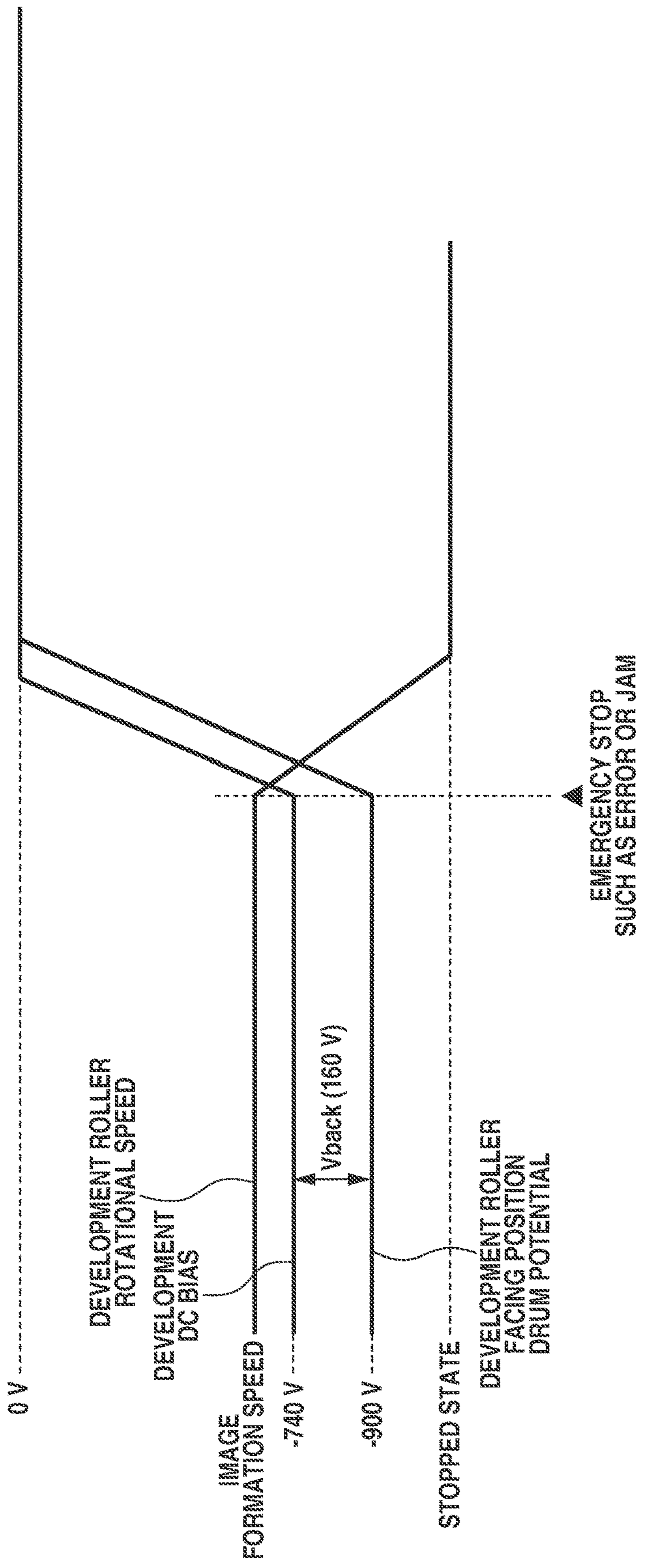
FIG. 12 is a diagram illustrating a sequence of an image forming operation (image formation operation) according to a ninth exemplary embodiment.

A sequence of an image forming operation (image formation operation) according to the ninth exemplary embodiment will be described with reference to FIG. 12. FIG. 12 illustrates the rotational drive of the development roller 44 from a halfway timing of an image formation operation to an image formation operation end, a development DC bias applied to the development roller 44, a value of the charging potential Vd at a facing position at which the photosensitive drum 1 faces the development roller 44, and a timing chart according to the ninth exemplary embodiment.

During image forming or in a state in which the image forming apparatus 100 is operating at a potential difference Vback similar to that at the image forming timing, an error or paper jam occurs, and the image forming apparatus 100 urgently stops in some cases. At the time of emergency stop, the driving of various members including the development roller 44 and voltage application to various members need to be inevitably stopped. At the time of emergency stop, it is desirable to issue stop instructions of the driving of various members and voltage application to various members as early as possible.

In the fifth to eighth exemplary embodiments described above, an operation to be performed in a case where an image forming operation normally ends is assumed. In the fifth to eighth exemplary embodiments described above, the driving of various members and voltage application to various members are stopped while the potential difference Vback being controlled by varying a charging DC bias to a plurality of steps to suppress carrier adhesion and fogging toner.

On the other hand, in the ninth exemplary embodiment, as illustrated in FIG. 12, at the time of emergency stop, the driving of various members and voltage application to various members are promptly stopped. By performing control in this manner, as compared with a case where end processing is performed while gradually varying a charging DC bias, the image forming apparatus 100 can be stopped in a shorter period.

Other Exemplary Embodiments

The present disclosure is not limited to the above-described exemplary embodiments, and various modifications (including organic combinations of exemplary embodiments) can be made based on the gist of the present disclosure, and these are not excluded from the scope of the present disclosure.

In the above-described exemplary embodiments, the description has been given of an example in which a charging DC bias is changed while a development DC bias Vdc to the development roller 44 being kept constant, when a potential difference Vback is changed at each timing, but the control is not limited to this. As long as the potential difference Vback is changed in such a manner as to satisfy a magnitude relation of potential differences Vback at each timing in the above-described exemplary embodiments, a modified example of also changing a development DC bias in addition to changing a charging DC bias may be applied.

In the above-described exemplary embodiments, the description has been given using an example of the image forming apparatus 100 having a configuration in which the intermediate transfer belt 62 is used, as illustrated in FIG. 1, but the configuration is not limited to this. The present disclosure can also be applied to an image forming apparatus having a configuration of performing transfer by sequentially bringing a recording medium into direct contact with the photosensitive drums 1.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2022-046197, filed Mar. 23, 2022, and No. 2022-046196, filed Mar. 23, 2022, which are hereby incorporated by reference herein in their entirety.

What is claimed is:

1. An image forming apparatus comprising:

an image bearing member;

a developing device including a development container configured to contain developer having toner and a carrier, and including a developer bearing member that is rotatable and configured to bear the developer to develop an electrostatic latent image formed on the image bearing member;

a drive unit configured to rotationally drive the developer bearing member;

a development bias application unit configured to apply a development bias to the developer bearing member; and a charging bias application unit configured to apply a charging bias to the image bearing member, wherein (i) a first absolute value of a difference between a surface potential of the developer bearing member to which the development bias has been applied by the development bias application unit and a surface potential of the image bearing member to which the charging bias has been applied by the charging bias application unit, where the surface potential of the image bearing member is at a facing position at which the image bearing member faces the developer bearing member and the first absolute value is obtained during a period from when rotational drive of the developer bearing member has been started by the drive unit until a rotational speed of the developer bearing member rotationally driven by the drive unit has reached a rotational speed of the developer bearing member at an image forming timing is smaller than (ii) a second absolute value of the difference between the surface potential of the developer bearing member to which the development bias has been applied by the development bias application unit and the surface potential of the image bearing member to which the charging bias has been applied by the charging bias application unit, where the surface potential of the image bearing member is at the facing position and the second absolute value is obtained after the rotational speed of the developer bearing member has reached the rotational speed of the developer bearing member at the image forming timing, wherein the charging bias application unit applies the charging bias to the image bearing member so that a surface potential of the image bearing member at the facing position becomes a first potential during the period from when rotational drive of the developer bearing member has been started by the drive unit, until the rotational speed of the developer bearing member rotationally driven by the drive unit has reached the rotational speed of the developer bearing member at the image forming timing, and wherein the charging bias application unit applies the charging bias to the image bearing member so that the surface potential of the image bearing member at the facing position becomes a second potential different from the first potential, after the rotational speed of the developer bearing member rotationally driven by the drive unit has reached the rotational speed of the developer bearing member at the image forming timing.

2. The image forming apparatus according to claim 1, wherein the charging bias application unit applies the charging bias to the image bearing member so that the surface potential of the image bearing member at the facing position becomes the second potential after the developer bearing member rotates once since the rotational speed of the developer bearing member rotationally driven by the drive unit has reached the rotational speed of the developer bearing member at the image forming timing.

3. The image forming apparatus according to claim 1, wherein the charging bias application unit applies the charging bias to the image bearing member so that the surface potential of the image bearing member at the facing position becomes the second potential after a lapse of 100 milliseconds (msec) since the rotational speed of the developer bearing member rotationally driven by the drive unit has reached the rotational speed of the developer bearing member at the image forming timing.

4. The image forming apparatus according to claim 1, wherein the charging bias application unit applies the charging bias to the image bearing member so that the surface potential of the image bearing member at the facing position becomes the second potential during a period until the image bearing member rotates once since the rotational speed of the developer bearing member rotationally driven by the drive unit has reached the rotational speed of the developer bearing member at the image forming timing.

5. The image forming apparatus according to claim 1, wherein the charging bias application unit applies the charging bias to the image bearing member so that the surface potential of the image bearing member at the facing position becomes the second potential during a period until a lapse of 216 milliseconds (msec) since the rotational speed of the developer bearing member rotationally driven by the drive unit has reached the rotational speed of the developer bearing member at the image forming timing.

6. The image forming apparatus according to claim 1, wherein (iii) the surface potential of the developer bearing member to which the development bias has been applied by the development bias application unit that is obtained during the period from when rotational drive of the developer bearing member has been started by the drive unit until the rotational speed of the developer bearing member rotationally driven by the drive unit has reached the rotational speed of the developer bearing member at the image forming timing and (iv) the surface potential of the developer bearing member to which the development bias has been applied by the development bias application unit that is obtained after the rotational speed of the developer bearing member rotationally driven by the drive unit has reached the rotational speed of the developer bearing member at the image forming timing since rotational drive of the developer bearing member has been started by the drive unit, and at the image forming timing are the same.

7. An image forming apparatus comprising:

an image bearing member;

a developing device including a development container configured to contain developer having toner and a carrier, and including a developer bearing member that is rotatable and configured to bear the developer to develop an electrostatic latent image formed on the image bearing member;

a drive unit configured to rotationally drive the developer bearing member;

a development bias application unit configured to apply a development bias to the developer bearing member;

a charging bias application unit configured to apply a charging bias to the image bearing member; and a control unit configured to control the drive unit, wherein (i) a first absolute value of a difference between a surface potential of the developer bearing member to which the development bias has been applied by the development bias application unit and a surface potential of the image bearing member to which the charging bias has been applied by the charging bias application unit, where the surface potential of the image bearing member is at a facing position at which the image bearing member faces the developer bearing member and the first absolute value is obtained during a period after image forming has ended and from when a rotational speed of the developer bearing member starts to decelerate from the rotational speed of the developer bearing member at an image forming timing until the rotational speed of the developer bearing member becomes zero is smaller than (ii) a second absolute value of the difference between the surface potential of the developer bearing member to which the development bias has been applied by the development bias application unit and the surface potential of the image bearing member to which the charging bias has been applied by the charging bias application unit, where the surface potential of the image bearing member is at the facing position and the second absolute value is obtained at the image forming timing, wherein, at the image forming timing, the charging bias application unit applies the charging bias to the image bearing member so that the surface potential of the image bearing member at the facing position becomes a first potential, wherein, after image forming has ended, the charging bias application unit applies the charging bias to the image bearing member so that the surface potential of the image bearing member at the facing position becomes a second potential different from the first potential, and wherein the control unit controls the drive unit so that the rotational speed of the developer bearing member decelerates from the rotational speed of the developer bearing member at the image forming timing after image forming has ended and after the surface potential of the image bearing member at the facing position has become the second potential.

8. The image forming apparatus according to claim 7, wherein the control unit controls the drive unit so that the rotational speed of the developer bearing member decelerates from the rotational speed of the developer bearing member at the image forming timing, after image forming has ended and after a lapse of 100 milliseconds (msec) since the surface potential of the image bearing member at the facing position has become the second potential.

9. The image forming apparatus according to claim 7, wherein the control unit controls the drive unit so that the rotational speed of the developer bearing member decelerates from the rotational speed of the developer bearing member at the image forming timing, after image forming has ended and until the image bearing member rotates once since the surface potential of the image bearing member at the facing position has become the second potential.

10. The image forming apparatus according to claim 7, wherein the control unit controls the drive unit so that the rotational speed of the developer bearing member decelerates from the rotational speed of the developer bearing member at the image forming timing after image forming has ended and until a lapse of 216 milliseconds (msec) since the surface potential of the image bearing member at the facing position has become the second potential.

11. The image forming apparatus according to claim 7, wherein (iii) the surface potential of the developer bearing member to which the development bias has been applied by the development bias application unit that is obtained during the period after image forming has ended and from when the rotational speed of the developer bearing member starts to decelerate from the rotational speed of the developer bearing member at the image forming timing, until the rotational speed of the developer bearing member becomes zero, and (iv) the surface potential of the developer bearing member to which the development bias has been applied by the development bias application unit that is obtained at the image forming timing are the same.

12. An image forming apparatus comprising:

a developing device having a development container configured to contain developer having toner and a carrier;

an image bearing member;

a developer bearing member included in the developing device, wherein the developer bearing member is rotatable and is configured to bear the developer to develop an electrostatic latent image on the image bearing member;

a charging bias application unit configured to apply a charging bias to the image bearing member;

a development bias application unit configured to apply a development bias to the developer bearing member; and a drive unit configured to rotationally drive the image bearing member and the developer bearing member;

wherein a facing position is an arrangement at which the image bearing member faces the developer bearing member, wherein a surface potential of the developer bearing member to which the development bias has been applied by the development bias application unit is a developer bearing member surface potential Vdc, wherein a surface potential of the image bearing member to which the charging bias has been applied by the charging bias application unit and is located at the facing position is an image bearing member surface potential Vd, wherein an absolute value of a difference between the developer bearing member surface potential Vdc and the image bearing member surface potential Vd is a value $|Vdc-Vd|$, wherein a first period is a period from when rotational drive of the developer bearing member has been started until a rotational speed of the developer bearing member is increased to a speed at which the image forming apparatus is configured to perform image forming to form an image on a sheet at an image forming timing, wherein the value $|Vdc-Vd|$ obtained during the first period is smaller than the value $|Vdc-Vd|$ obtained after the first period, wherein, during the first period, the charging bias application unit applies the charging bias to the image bearing member so that the image bearing member surface potential Vd at the facing position becomes a first potential, and wherein, after the first period, the charging bias application unit applies the charging bias to the image bearing member so that the image bearing member surface potential Vd at the facing position becomes a second potential different from the first potential.

13. The image forming apparatus according to claim 12, wherein a second period is a period after the first period when the image forming is being performed and during the image forming timing, wherein a third period is a period after the second period when the image forming has ended and from when the rotational speed of the developer bearing member at the image forming timing is decreased to when the rotational speed of the developer bearing member becomes zero, wherein the value |Vdc−Vd| obtained during the third period is smaller than the value |Vdc−Vd| obtained during the second period, and wherein, after the second period when the image forming has ended, the charging bias application unit applies the charging bias to the image bearing member so that the image bearing member surface potential Vd at the facing position becomes a third potential different from the second potential.

* * * * *